US007106557B2

(12) United States Patent
Kuwajima et al.

(10) Patent No.: US 7,106,557 B2
(45) Date of Patent: Sep. 12, 2006

(54) HEAD SUPPORTING MECHANISM

(75) Inventors: Hideki Kuwajima, Kyoto (JP); Kaoru Matsuoka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 114 days.

(21) Appl. No.: 10/919,437

(22) Filed: Aug. 17, 2004

(65) Prior Publication Data

US 2005/0013056 A1 Jan. 20, 2005

Related U.S. Application Data

(63) Continuation of application No. 09/977,997, filed on Oct. 17, 2001, now Pat. No. 6,785,096.

(30) Foreign Application Priority Data

Oct. 23, 2000 (JP) .......................... P2000-322441
Oct. 4, 2001 (JP) .......................... P2001-308614

(51) Int. Cl.
*G11B 21/24* (2006.01)

(52) U.S. Cl. .................................................. 360/294.4

(58) Field of Classification Search ............ 360/294.4, 360/234.6

See application file for complete search history.

(56) References Cited

U.S. PATENT DOCUMENTS 5,764,444 A 6/1998 Imamura et al.
5,856,896 A 1/1999 Berg et al.
6,046,884 A 4/2000 Crane
6,078,473 A 6/2000 Crane et al.
6,118,637 A 9/2000 Wright et al.
6,181,531 B1 1/2001 Koshikawa et al.
6,297,936 B1 10/2001 Kant et al.
6,359,758 B1 3/2002 Boutaghou
6,381,104 B1 4/2002 Soeno et al.
6,396,667 B1 * 5/2002 Zhang et al. ............ 360/294.3
6,414,823 B1 * 7/2002 Crane et al. ............. 360/294.5
2001/0012182 A1 * 8/2001 Boutaghou et al. ...... 360/245.7
2001/0021086 A1 * 9/2001 Kuwajima et al. ....... 360/294.4

FOREIGN PATENT DOCUMENTS

JP 2-403526 12/1990
JP 03097174 4/1991
JP 06150596 5/1994
WO WO98/44488 A 10/1998

* cited by examiner

*Primary Examiner*—A. J. Heinz
*Assistant Examiner*—Mark Blouin
(74) *Attorney, Agent, or Firm*—McDermott Will & Emery LLP

(57) ABSTRACT

A load beam is attached to an actuator arm that is allowed to rock around a pivotal axis by a voice coil motor, etc., as a slider supporting member, the base end of a flexure is attached to the load beam with the free end thereof being left, a slider supporting member is attached to the top portion of the flexure, a slider on which a recording/reproduction head is installed is secured to the slider supporting member, and the slider supporting member is supported by a protrusion placed on the free end side of the load beam so as to be freely pivot thereon. Portions of the flexure corresponding to both of the sides of this protrusion are constituted by elastic hinge portions, each having a necked shape. A pair of thin-film piezoelectric elements are bonded to the flexure as displacement members. In a tracking compensation operation of the head, forces are exerted on the slider supporting member through the elastic hinge portion by extending and contracting operations of the pair of thin-film piezoelectric elements so that the slider is allowed to pivot around the protrusion of the load beam serving as the center of pivotal movements, together with the slider supporting member.

11 Claims, 15 Drawing Sheets

100 50 60 40 33X 30 33Z 33Y 36 37 31 33 33c 33b 33e 32 33a 33d 33f 32b 27b 23 21 22 27a 24 28 26b 25 26a 10

K
32'
32a'
32b (28)
33b
33a
50

32
32a
32d
32b (28)
33b
50
Dp
Dr
32c
33a 50
28
33e
40b
33d
40a
30
20
L1
204
202
203
205b
201
205a
L2
303
302c
302b
304b
302
302a
304a
301

90
80a
(G)
X
Y
82b
81b
82c
82a
81a 90
82c
82b
Y
G
F
81b
82a
81a 90
80a
82b
81b
G
82a
81a 90
82b
81b
G
F
E
D
82c
(80a)
82a
81a 90
82b
R
H
81b
G
F
80a
82a
81a

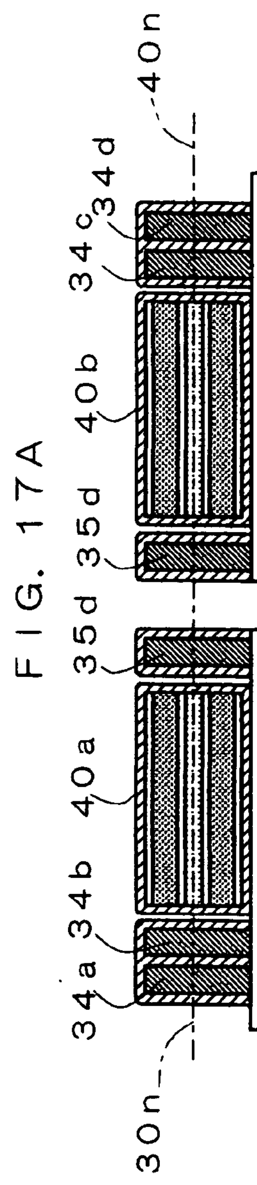
FIG. 17A
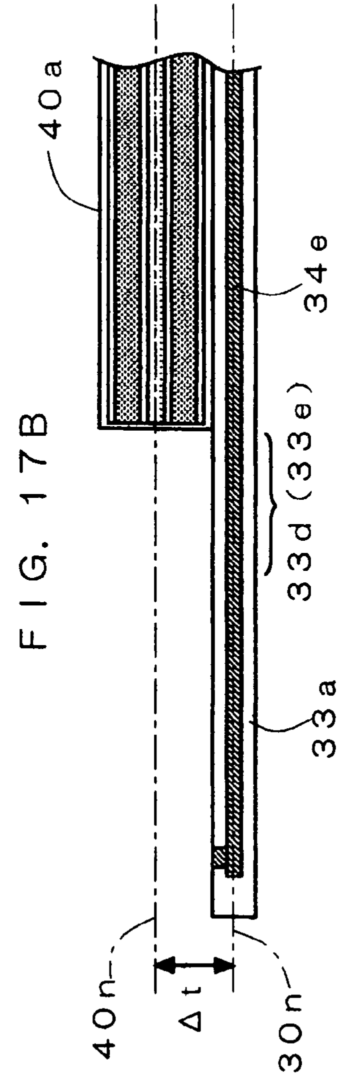
FIG. 17B
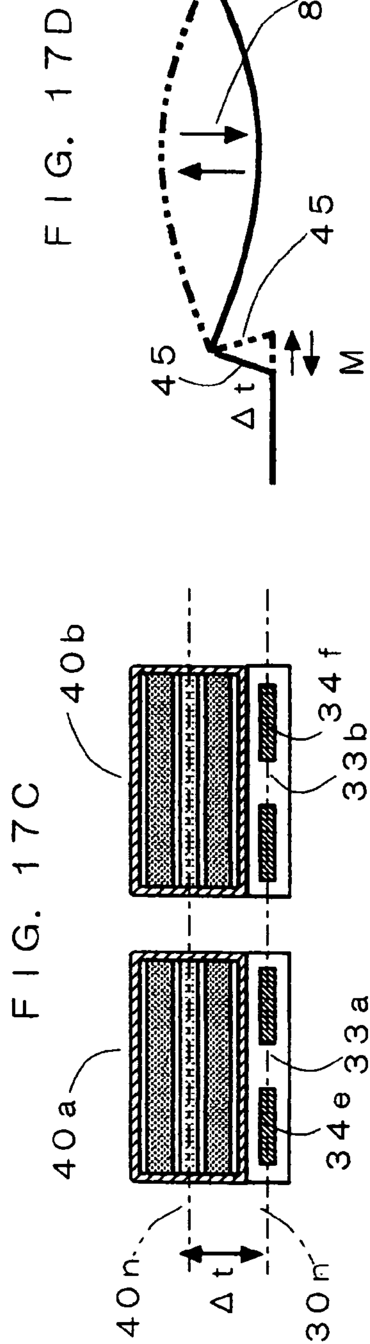
FIG. 17C
FIG. 17D

Head positioning control section
8
2
7
6
3
4
5
100
20
50
1
70

HEAD SUPPORTING MECHANISM

This application is a continuation of application Ser. No. 09/977,997 filed Oct. 17, 2001 now U.S. Pat. No. 6,785,096.

BACKGROUND OF THE INVENTION

1. Field of the Invention

The present invention relates to a head supporting mechanism for supporting a recording/reproduction use head that makes an access to a recording medium in an information recording apparatus.

2. Description of the Related Art

A head for recording/reproducing data on and from an information recording medium in an information recording apparatus such as a magnetic disk apparatus is installed on a slider that allows the head to float over the recording medium with a fine gap in between. A head supporting mechanism is used for supporting this head slider. The head supporting mechanism is attached to an actuator arm that is driven by a voice coil motor (VCM) serving as a driving source.

A suspension arm is attached to the actuator arm that is driven by the voice coil motor so as to freely pivot thereon, and the head slider is attached to the suspension arm. A fine-movement actuator utilizing a thin-film piezoelectric element is interpolated between the actuator arm and the suspension arm so that the suspension arm is allowed to pivot by driving the fine-movement actuator, thereby allowing the head on the slider to land on a track.

Great shifts such as a seeking operation of the head slider are carried out by controlling the voice coil motor, and the tracking compensation for landing-on a track is carried out by controlling the fine-movement actuator.

However, recent developments of high recording density in recording media and the resulting high-speed rotation of the recording medium have taken place so fast that it is sometimes difficult for the head supporting mechanism of the above-mentioned arrangement to follow the developments.

In the case of the head supporting mechanism having the above-mentioned arrangement, the entire suspension arm including the head slider is driven by the fine-movement actuator. However, the suspension arm is considerably long, and has a great mass with a great moment of inertia. For this reason, in the tracking compensation for positioning the head on a target track when the head is lifted off track, it is difficult to properly provide a high-speed response with high precision.

SUMMARY OF THE INVENTION

Therefore, the main objective of the present invention is to provide a head supporting mechanism of an information recording apparatus that can achieve a high-speed responding property and a high-precision positioning control in the tracking compensation for a target track.

Another objective of the present invention is to provide a head supporting mechanism that can improve the floating characteristic of the slider with respect to the recording medium.

Still another objective, feature and advantage of the present invention will be clarified by the following description.

In order to solve the above-mentioned subjects, the present invention relating to the head supporting mechanism is provided with the following means.

A slider-supporting beam is attached to an actuator arm that shifts relative to a recording medium. A slider supporting member is supported on a free end of the slider supporting beam so as to freely rotate thereon. A displacement member is connected to the slider supporting member, and based upon the operation of the displacement of the displacement member, the slider supporting member is allowed to pivot around the pivotal center together with the slider placed thereon. The displacement member is directly or indirectly attached to a slider supporting beam. The connecting point of the displacement member and the slider supporting member is placed at a position different from the pivotal center so that the displacement of the displacement member allows the slider supporting member to pivot around the pivotal center.

In other words, the head supporting mechanism of the present invention is provided with a slider on which a head for recording and reproducing data on and from the recording medium is installed, a slider supporting member for supporting the slider, a slider supporting beam the base side of which is attached to the actuator arm and the free end of which is provided with the slider supporting member so as to freely pivot thereon, and a displacement member which makes a displacement so that the slider supporting member is allowed to pivot together with the above-mentioned slider.

Here, the relative shifts of the actuator arm may be provided as rocking movements or linear shifts.

In accordance with the above-mentioned arrangement, the displacement member is operated so that the slider supporting member supporting the slider is allowed to pivot around the pivotal center with respect to the slider supporting beam. The slider is allowed to pivot together with the slider supporting member.

In the case when the slider supporting beam is connected to the actuator arm so as to freely pivot thereon and the entire portion of the slider supporting beam is allowed to pivot, the slider supporting beam including the slider that is to pivot has a greater mass. Moreover, the length of the slider supporting beam that corresponds to an effective radius of the displacement of the slider is greater. Therefore, when the slider supporting beam is allowed to pivot so as to make a displacement of the slider, a delay in response may occur.

In contrast, in the present invention, the slider supporting member is allowed to pivot around the pivotal center within the area range of the slider supporting member itself. The pivotal centers of the slider and the slider supporting member that are the subjects of the pivot need not be coincident with the center of gravity of the slider; however, they are certainly placed within the area of the slider supporting member. The slider supporting member is supported within the area range so as to freely pivot therein so that the effective radius of the pivot is sufficiently small as compared with the case in which the slider supporting beam is allowed to pivot. Moreover, the subjects of the pivot are the slider and the slider supporting member, and their masses are smaller than the mass of the slider supporting beam containing the slider. The moment inertia of the two members, that is, the slider and the slider supporting member, is smaller than the moment inertia of the three members, that is, the slider, the slider supporting member and the slider supporting beam; therefore, it is possible to set smaller the driving torque of the slider and the slider supporting member caused by the operation of the displacement member. Moreover, since they have a small dimension and light weight, it is possible to improve the response characteristic and precision in the tracking compensation for positioning to a target track when the head has a positional deviation from the target track. In other words, the present invention makes it possible to provide a head supporting mechanism of an information recording apparatus which can make a fine displacement on the head with high precision at high speeds.

In a preferred embodiment of the above-mentioned head supporting mechanism, the pivotal center at which the slider supporting member is supported to freely pivot thereon by the slider supporting beam is set to a position corresponding to the center of gravity of the slider or the vicinity thereof.

The displacement of the displacement member allows the slider supporting member to pivot around the pivotal center together with the slider; and in this case, when the pivotal center is set at the position of the center of gravity of the slider, it is possible to smoothly carry out the pivotal movement of the slider caused by the displacement of the displacement member.

In another preferred embodiment of the above-mentioned head supporting mechanism, a pair of the above-mentioned displacement members are placed in a symmetric manner. The pair of displacement members are placed symmetrically with respect to the center line along the length direction of the slider supporting beam passing through the center of rotation of the slider supporting member. Moreover, either one of the paired displacement members is extended, with the other being contracted, so that they are allowed to carry out respective operations in directions opposite to each other.

This is a translational arrangement of a link mechanism, and with respect to the operations for allowing the slider to pivot together with the slider supporting member around the pivotal center, the pivotal operation in the clockwise direction and the pivotal operation in the counterclockwise direction are made equivalent to each other. In addition, both of the pivotal operation in the clockwise direction and the pivotal operation in the counterclockwise direction allow the pivotal movement of the slider to become more smoother. Here, with respect to the translational link mechanism, a pair of displacement members are not necessarily set in parallel with each other.

In still another preferred embodiment of the above-mentioned head supporting mechanism, the slider supporting beam is formed as a load beam having an elasticity, and this load beam and the slider supporting member are connected to each other through a flexure that is a flexible wiring substrate for providing wiring to the head in the slider, and a protrusion placed on the free end of the load beam is allowed to contact the slider supporting member so that the above-mentioned protrusion supports the slider supporting member so as to freely pivot thereon centered on the protrusion serving as the pivotal center.

The slider supporting beam is designed as a load beam having an elasticity. The flexure is secured to the load beam with one portion thereof being not secured, a slider supporting member is attached to the portion of the flexure that is not secured. The protrusion on the free end of the load beam presses the slider supporting member attached to the flexure toward the recording medium, thereby applying a load thereon.

The slider, which faces the surface of the recording medium rotating at a high speed, is allowed to float by a pressure caused by air currents generated on the surface of the recording medium. Even when the surface of the recording medium has a waved form, the flexure and load beam are properly combined so that the fine gap distance between the slider and the recording medium is maintained at a predetermined range. In other words, it is possible to improve the floating characteristic of the slider.

In a preferred embodiment of the above-mentioned arrangement, the displacement member is formed by a thin-film piezoelectric element, and this thin-film piezoelectric element is bonded to the flexure. The thin-film piezoelectric element is fine in dimension, the thickness is sufficiently thin with a sufficiently light weight, and the operational characteristic in extension and contraction at the time of the voltage control is stable. By bonding the thin-film piezoelectric element to the flexure, it is possible to easily arrange the displacement member in the vicinity of the slider supporting member.

In a preferred embodiment in the above-mentioned arrangement, in the above-mentioned flexure, at two portions that are symmetrical with respect to the center line along the length direction of the load beam passing through the protrusion of the load beam, a pair of elastic hinge portions, each having a necked shape, are formed. In this case, with respect to the displacement member, it does not make any difference whether or not it is provided as the thin-film piezoelectric element.

The slider supporting member is attached to a flexure portion closer to the free end than to the paired elastic hinge portions. The paired displacement members are connected to the slider supporting member attached to the flexure portion on the free end side through the pair of elastic hinge portions.

The slider supporting member, attached to the flexure through the pair of elastic hinge portions, that is, the slider, is allowed to have a flexible state in each of the pitching direction and the rolling direction, that is, the degree of freedom in both of the directions. Therefore, even when the recording medium rotating at a high speed has a waved surface, it is possible to provide a superior floating characteristic of the slider with respect to the surface of the recording medium.

It is essential to allow the yawing of the slider to make a high-speed in response to the tracking compensation while maintaining the free pitching and rolling states of the slider.

One of the displacement members is extended, while the other displacement member is contracted. On the extended side, the elastic hinge portion is pushed out toward the free end so that the slider supporting member is displaced around the pivotal center. The transmission of this displacement is alleviated by the elastic hinge portion on the contracted side, with the result that the operating force of the displacement is not transmitted to the displacement member on the other extended side.

Moreover, on the contracted side, the elastic hinge portion is pulled back to the base side, thereby allowing the slider supporting member to be displaced around the pivotal center. The transmission of this displacement is alleviated on the elastic hinge portion on the extended side, with the result that the active force of the displacement is not transmitted to the displacement member on the other extended side.

Therefore, the pair of displacement members allow virtually only the flexure portion that is closer to the free end side than to the pair of elastic hinge portions to pivot around the pivotal center, with the mutual symmetrical relationship being maintained. In other words, the operations of the extension and contraction of the pair of displacement members, that is, the extension of one of the members and the contraction of the other member are smoothly achieved, without causing any interference from each other. Consequently, it is possible to allow the slider to smoothly pivot with less resistance by using a smaller driving force. Moreover, the tracking compensation for the head is achieved at high speeds with high precision, with less response delay.

In a preferred embodiment in the above-mentioned arrangement, the pair of elastic hinge portions are placed on a straight line in a right angle direction with respect to the center line of the load beam, which passes through the protrusion on the load beam. In this case, it is possible to transmit the driving force of the displacement member more effectively. If the pair of elastic hinge portions are placed so as to be separated from the straight line passing through the protrusion, mismatching will occur with respect to the active force transmission, causing a reactive force and the subsequent beating phenomenon in the load beam. When it is placed on the straight line passing through the protrusion, such reactive force and beating phenomenon are not generated. Therefore, it is possible to provide the high-speed response property and high-precision positioning property more effectively.

In a more preferable embodiment in the above-mentioned arrangement, a pair of thin-film piezoelectric elements are symmetrically placed as the displacement members. The pair of thin-film piezoelectric elements are symmetrically placed with respect to the center line along the lengthwise direction of the load beam, which passes through the protrusion forming the rotation center in the load beam. The pair of thin-film piezoelectric elements are bonded to a flexure. The pair of thin-film piezoelectric elements are allowed to extend and contract in the mutually reversed directions so that either one of the pair of thin-film piezoelectric elements is extended with the other being contracted. With this translational arrangement of the link mechanism in the thin-film piezoelectric elements, the pivotal movement of the slider in any of the clockwise direction and the counter clockwise direction is made equivalent to each other, and is also made smoother.

In a preferable embodiment in the above-mentioned arrangement, the slider supporting member is supported so as to freely pivot on the position of the center of gravity of the entire subject of the pivotal movement consisting of the slider and the slider supporting member. If the subject of the pivotal movement is supported so as to freely pivot on a position apart from the center of gravity, a moment corresponding to the radius from the pivotal center and the center of gravity is generated, thereby causing a reactive force on the pivotal center. This reactive force reversely acts on the pair of displacement members, thereby returning the subject of the pivotal movement in the reversed direction. This causes a response delay in the tracking compensation. By making the fulcrum of the pivotal movement and the center of gravity of the pivotal movement coincident with each other, it becomes possible to prevent the generation of the reactive force, and consequently to more effectively transmit the driving force of the displacement member. Therefore, it is possible to provide the high-speed responding property and the high-precision positioning operation more effectively.

In a preferable embodiment in the above-mentioned arrangement, the slider supporting member is constituted by a main section to be connected to the flexure and a slider center-of-gravity holding section. The slider center-of-gravity holding section is formed in a manner so as to connect to the main section for the connection to the flexure, thereby allowing the protrusion on the load beam to contact as well as fixing the slider in its center of gravity or in the vicinity thereof.

The protrusion on the free end of the load beam supports the slider on its center-of-gravity or in the vicinity thereof through the slider center-of-gravity holding section of a slider supporting member, and also provides the center of the pivotal movement to the slider. Thus, the relative orientation angle of the slider with respect to the load beam, in particular, the setting of the inclination in the pitching direction, can be accurately achieved by simple methods, that is, the adjustments of the protruding amount of the protrusion and the dimension of the slider center-of-gravity holding section.

The relative inclination in the pitching direction of the slider with respect to the recording medium is determined in various manners depending on the specifications in the information recording apparatus. In response to each of the variations, not an arrangement in which each of all the constituent elements is modified so as to be applied to each specification, but an arrangement in which the load beam and slider are set as commonly-used components and the dimension of the slider center-of-gravity holding section is adjusted in the slider supporting member is utilized. In other words, the setting of the relative inclination in the pitching direction in the slider with respect to the recording medium is easily carried out, thereby making it possible to provide a superior floating characteristic of the slider.

In a preferable embodiment in the above-mentioned arrangement, the above-mentioned slider supporting member is provided with a mass balancing section for balancing the mass of the main section with respect to the slider center-of-gravity holding section, in addition to the main section and the slider center-of-gravity holding section.

In the flexure, the slider supporting member is attached to the free end side as compared with the elastic hinge portion; and in order to provide a preferable floating characteristic for the slider, the slider supporting member needs to be set free from the portion to which the thin-film piezoelectric element is bonded in the flexure. However, in contrast, the slider supporting member is preferably arranged so as to support the slider on its center of gravity. In this case, without any modification, the shape of the slider supporting member would cause degradation in the entire mass balance with respect to its slider center-of-gravity holding section. This arrangement is made because in the flexure, it is not preferable to make the slider supporting member in contact with the portion to which the thin-film piezoelectric element is added.

For this reason, the above-mentioned mass balancing section is installed so as to provide a well-balanced mass as a whole. The protrusion on the load beam supports the slider supporting member on its center of gravity, and also indirectly supports the slider on its center of gravity or on the vicinity thereof. In other words, the entire portion of the subject of the pivotal movement including the slider supporting member and the slider can be supported in a well-balanced manner; therefore, it is possible to improve the floating characteristic of the slider in both of the pitching direction and the rolling direction.

In a preferable embodiment in the above-mentioned arrangement, the above-mentioned slider center-of-gravity holding section has an arrangement in which a portion extending integrally from the main section of the slider supporting member is formed by a bending process. Thus, it is possible to simplify the structure for easily setting the inclination of the slider in the pitching direction.

Moreover, in a preferable embodiment in the above-mentioned arrangement, the above-mentioned slider center-of-gravity holding section is formed by integrally molding it together with the molding process of the wiring-use flexible substrate of the flexure. Thus, it is possible to provide a smooth yawing operation of the slider while maintaining a sufficient degree of freedom in the pitching operation and the rolling operation of the slider. It is also possible to easily form the slider center-of-gravity holding section.

In a preferable embodiment in the above-mentioned arrangement, the above-mentioned pair of elastic hinge portions are placed within a slider area range when viewed in the stacking direction of the slider and the slider supporting member.

In the case when a pair of elastic hinge portions are placed outside the slider area range, the distance from the pivotal center to the elastic hinge portion is long. The angle in which the slider is allowed to pivot is small with respect to an extension or a contraction at a fixed dimension of the displacement member. In the case when the angle $\theta$ is minute, if $\theta$ is represented by a radian unit, the following equation is satisfied with respect to a minute deviation $\epsilon$ in the displacement member in the radius r from the pivotal center.

$$\theta=\epsilon/r$$

Thus, the smaller the radius r, the greater the pivotal angle $\theta$. By placing the pair of the elastic hinge portions within the slider area range, it is possible to make the pivotal angle of the slider greater with respect to a fixed displacement of the displacement member. Consequently, it is possible to improve the responding property in the tracking compensation.

Here, in the case when a pair of elastic hinge portions are placed within the area range of the slider, the arrangement of the above-mentioned mass balancing portion becomes more beneficial.

In a preferable embodiment of the above-mentioned arrangement, the thin-film piezoelectric member is constituted by a plurality of piezoelectric elements that are stacked, with the voltage-applying directions of the plurality of thin-film piezoelectric elements being set opposite to each other.

In this case, in comparison with a single-layered thin-film piezoelectric member, it is possible to provide a sufficient power for allowing the slider to pivot for the tracking compensation. Moreover, it is possible to prevent warping due to bimorph and consequently to extend and contract the thin-film piezoelectric member within the in-plane of the original film in a manner of parallel displacement. In the case of a single layer, a warp is generated. Even in the case of a plurality of layers, a warp is generated in each layer; however, by reversing the respective voltage-applying directions, the directions of the warps are made opposite to each other so as to cancel the warps as a whole. By restricting the wasteful movement of the warp, it becomes possible to effectively utilize the extending and contracting energy, and consequently to improve the responding property of the tracking compensation.

In a preferable embodiment in the above-mentioned arrangement, with respect to the application of a voltage to the pair of thin-film piezoelectric members, a bias voltage is applied in its initial conditions, and based upon this bias voltage, voltages having mutually reversed polarities are applied in its extending and contracting operations.

In this case, the length of the thin-film piezoelectric member with a bias voltage being applied is determined as a reference. In other words, a voltage to be applied to both of the thin-film piezoelectric members when the head is landed on a target track is a bias voltage. Depending on cases in which a voltage higher than the bias voltage and a voltage lower than the bias voltage are applied, the extending and contracting operations are set symmetrical with each other.

When the head is dislocated from the target track, a tracking compensation control operation is carried out. When the head is dislocated in the right direction from the target track, it is returned to the left direction; however, it is difficult to allow the head to land directly on the target track by using only this operation. Due to an overshoot, this time, the head is dislocated in the left direction from the target track. At this time, the head is returned in the right direction. In other words, alternate movements are carried out. In this case, the directions of voltages to be applied to the pair of thin-film piezoelectric members are also alternately changed. Therefore, when voltages in the reversed polarities are applied based upon the bias voltage, the extending and contracting operations are set symmetrical with each other, thereby making it possible to quickly carry out the reducing process of the hunching due to the overshoot. As a result, controlling operations of the extending and contracting operations in the thin-film piezoelectric members are carried out at high speeds with high precision.

In a preferable embodiment in the above-mentioned arrangement, wires in the above-mentioned flexure are placed along the end edges of the flexure on both of the outsides of the thin-film piezoelectric member that is bonded to the flexure. Thus, the strength of the flexure is increased by the wires so that it becomes possible to prevent the flexure from warping due to the extending or contracting thin-film piezoelectric member, and consequently to effectively transmit the extending or contracting force of the thin-film piezoelectric member to the slider supporting member.

In a preferable embodiment in the above-mentioned arrangement, the above-mentioned flexure and the thin-film piezoelectric member are arranged so that neutral axes on the center in the thickness direction of the two members are set to be virtually coincident with each other.

When voltages in the reversed polarities are alternately applied to the thin-film piezoelectric member, the corresponding vibrations are generated in the flexure. These vibrations take place in the normal direction with respect to the surface of the flexure. In this case, when the neutral axis of the flexure and the neutral axis of the thin-film piezoelectric member have a step difference in the normal direction, the step difference dimension is allowed to form the arm of a moment. Then, the vibration of the flexure is amplified through the arm, resulting in a phenomenon in which the elastic hinge portion is vibrated. This phenomenon causes an unnecessary movement in the pitching direction in the slider.

Therefore, by making the neutral axis of the flexure (elastic hinge) and the neutral axis of the thin-film piezoelectric member coincident with each other, the arm of the moment is eliminated so that even when the flexure is vibrated, the amplification thereof is suppressed. Consequently, it is possible to control the tracking compensation at high speeds, with high precision.

In a preferable embodiment in the above-mentioned arrangement, the thin-film piezoelectric member is coated with a protection member. Thus, the thin-film piezoelectric member is protected and the thickness of the thin-film piezoelectric member is increased so that it is possible to suppress the warp of the thin-film piezoelectric member and also to provide a more effective operation of the slider pivotal movement caused by the extension and contraction of the thin-film piezoelectric member.

In a preferable embodiment in the above-mentioned arrangement, a wire is allowed to pass through the pair of elastic hinge portions. Here, the thickness of the wire passing through the elastic hinge section is set to be greater than the width thereof. This portion of the flexure, which has a necked shape, is also used as the elastic hinge portion and the line passage portion. Further, this essential thin portion having the necked shape is reinforced so as to improve the reliability.

Here, with respect to information recording apparatuses to which the above-mentioned head supporting mechanism is applied, apparatuses such as a magnetic disk apparatus, an optical disk apparatus and a magneto-optical disk apparatus, are listed.

BRIEF DESCRIPTION OF THE DRAWINGS

These and other objects, advantages, features, and uses of the invention will become more apparent from the following description of preferred embodiments of the invention with reference to the accompanying drawings wherein:

FIG. 17A is a cross-sectional view that shows a structure in which the neutral axis of the flexure and the neutral axis of the thin-film piezoelectric element are coincident with each other in the head supporting mechanism in accordance with the embodiment of the present invention;

FIGS. 17B and 17C are explanatory drawings of a comparative example;

In all these figures, like components are indicated by the same numerals.

DETAILED DESCRIPTION OF THE PREFERRED EMBODIMENTS

Referring to Figures, the following description will discuss preferred embodiments of the head supporting mechanism of an information recording apparatus in accordance with the present invention.

Figure 19:
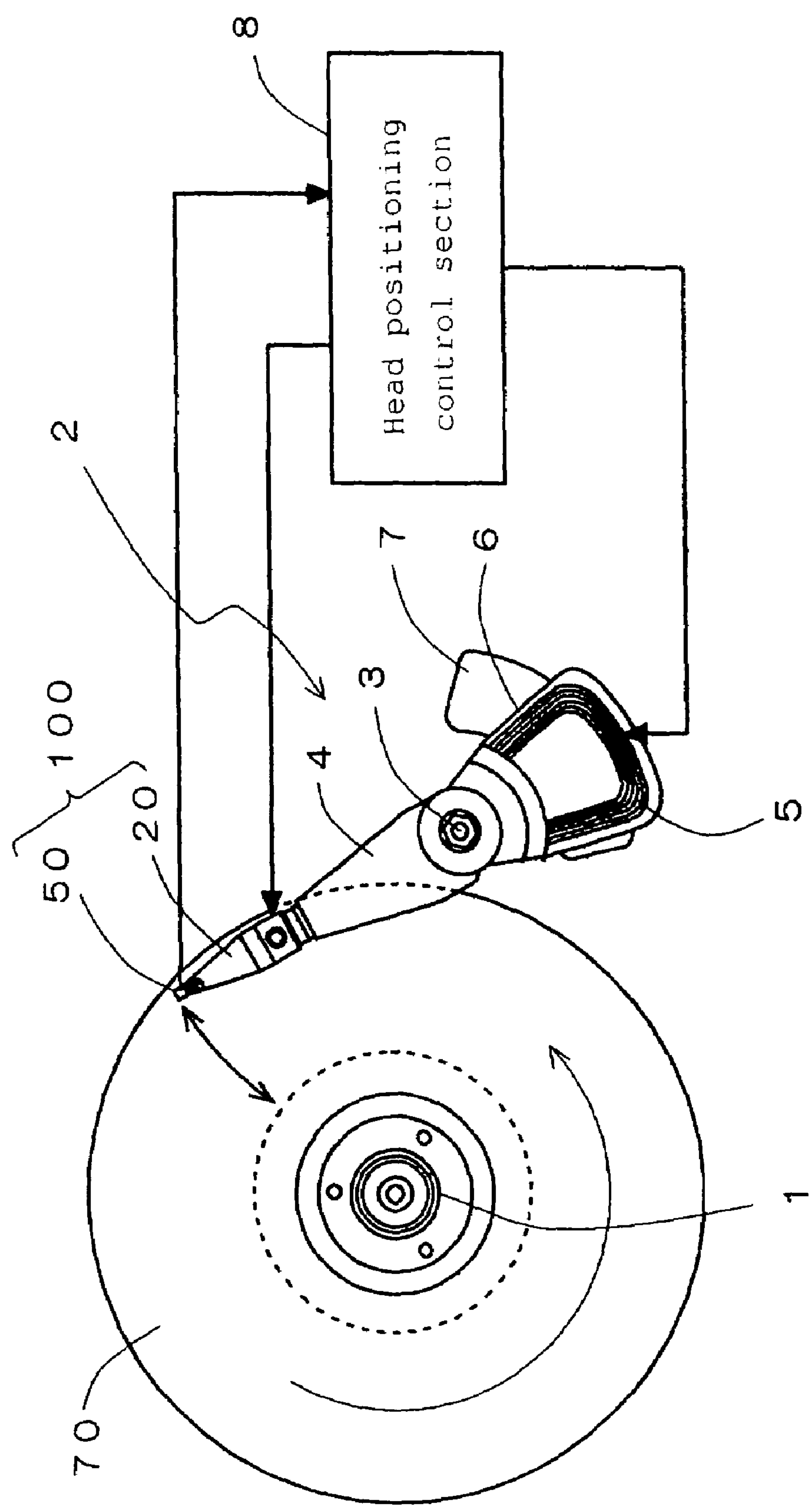
FIG. 19 is a plan view that shows a structure of a magnet disk apparatus.

In FIG. 19 that shows the structure of a magnetic disk apparatus, reference number 70 is a magnetic disk, 1 is a spindle motor for driving the magnetic disk 70 at high speeds while supporting it in the center, and 2 is a head actuator. The head actuator 2 is provided with an actuator arm 4 supported by a pivotal axis 3, a coil arm 5 that is placed in a manner so as to connect to the actuator arm 4 and placed at a position on the side opposite to the pivotal axis 3, a coil 6 that is attached to the coil arm 5, a slider supporting beam 20 attached to the base end on the free end side of the actuator arm 4, and a slider 50 attached to the free end side of the slider supporting beam 20. The slider 50 is provided with a head. Reference numeral 7 is a permanent magnet attached to a box-shaped body in a manner so as to face the coil 6. In FIG. 19, the slider supporting beam 20 and the slider 50 correspond to a head supporting mechanism 100.

Figure 1:
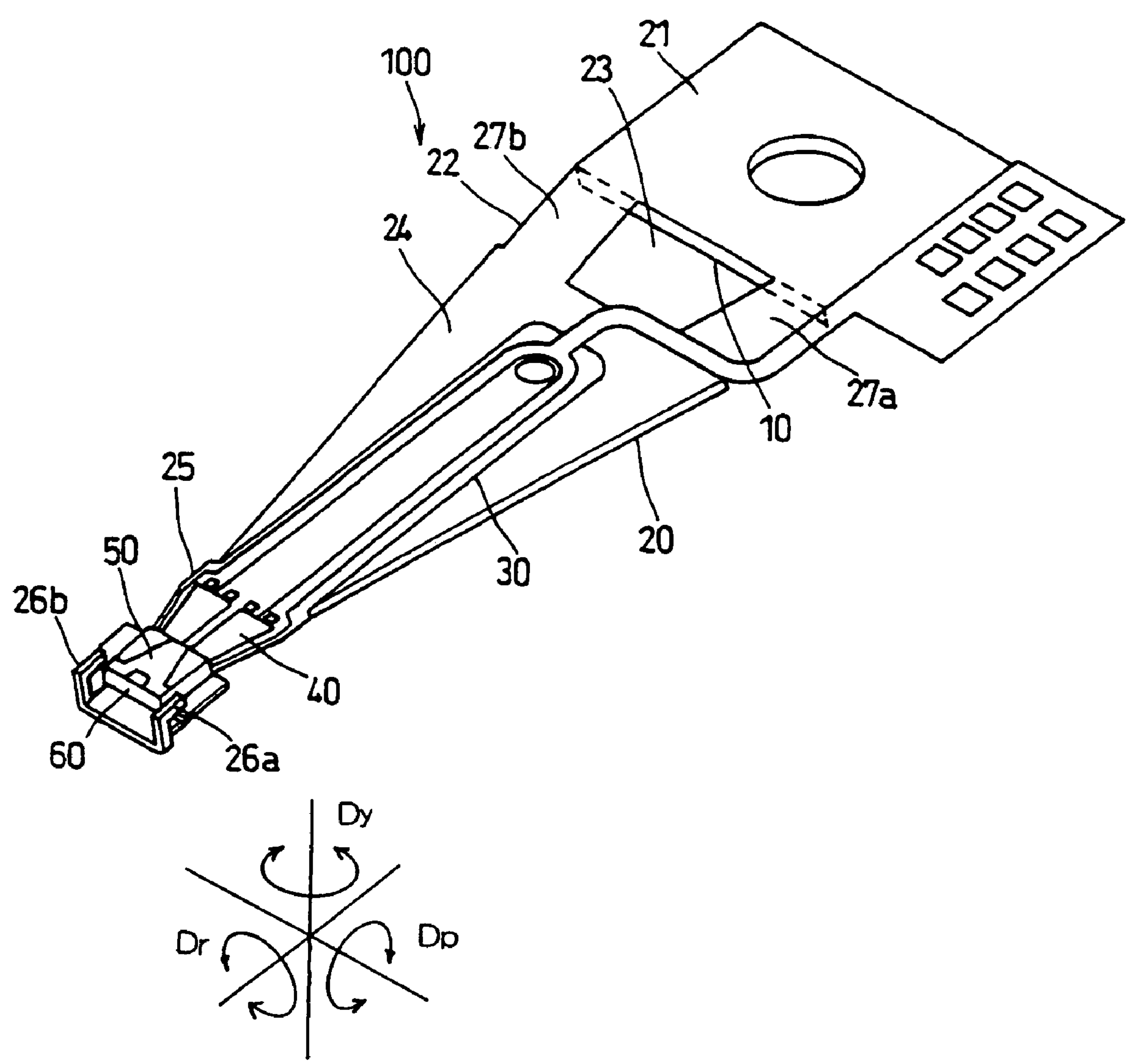
FIG. 1 is a perspective view that shows the entire structure of a head supporting mechanism in accordance with an embodiment of the present invention.
Figure 2:
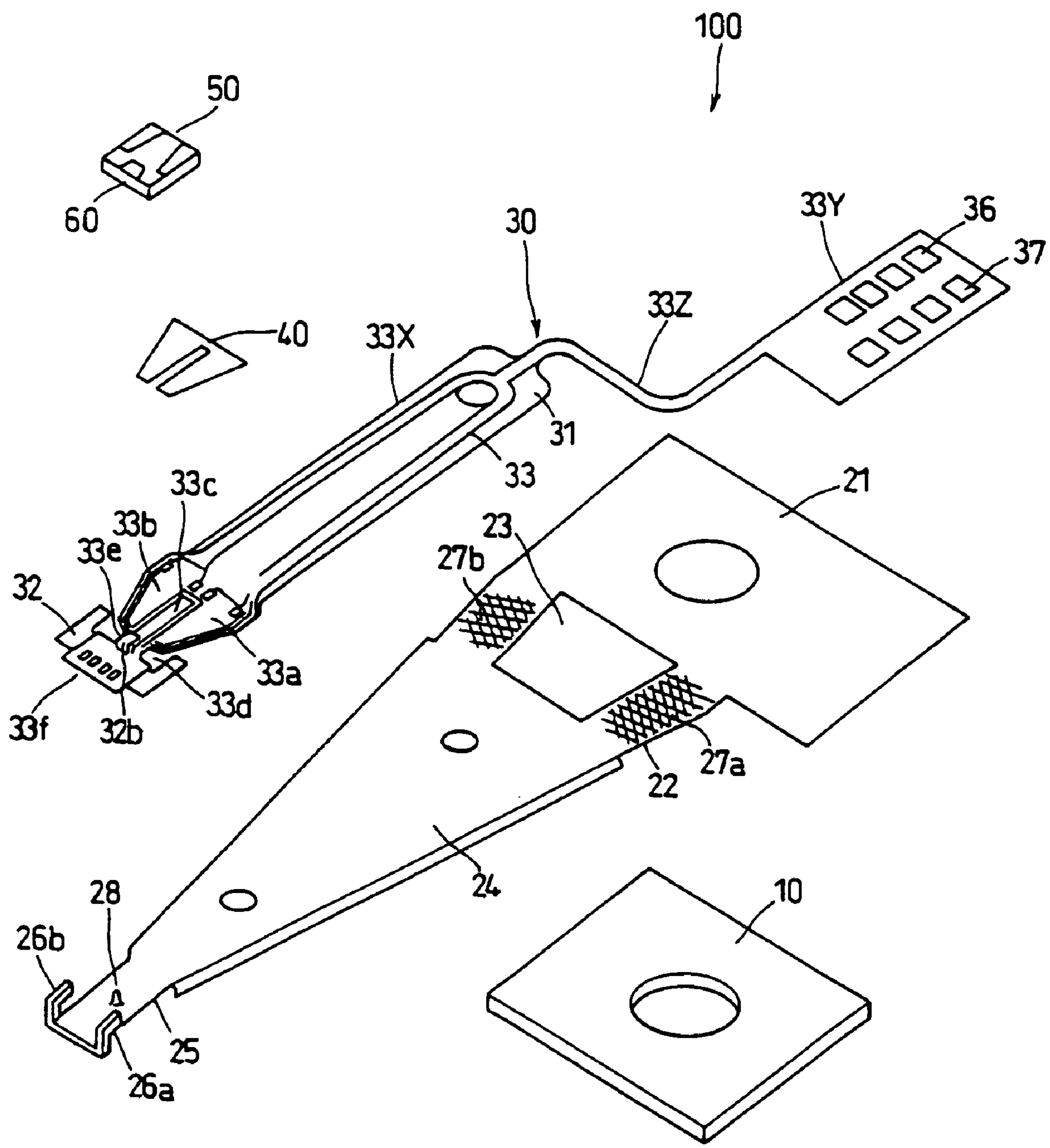
FIG. 2 is a perspective view that shows a head supporting mechanism in an exploded manner in accordance with the embodiment of the present invention.

FIG. 1 shows a head supporting mechanism 100 in accordance with a preferred embodiment of the present invention, and FIG. 2 shows the head supporting mechanism 100 in an exploded manner. With respect to the constituent elements, the head supporting mechanism 100 is mainly constituted by a base plate 10, a load beam 20, a flexure 30, a thin-film piezoelectric unit 40, a slider 50 and a magnetic head 60. The load beam 20 is a typical example of a slider supporting beam, and the thin-film piezoelectric unit 40 is a typical example of a displacement member.

The base plate 10 is attached to the actuator arm 4 shown in FIG. 19. The load beam 20 is fixed to the base plate 10 on its base end side. The load beam 20 has an elastic property in the normal direction to its plate face. A protrusion 28, which forms the center of pivotal movements of the slider 50, is placed on the free end side of the load beam 20. A slider supporting member 32 is supported on the protrusion 28 in a manner so as to freely pivot thereon. The slider 50 is fixed to the slider supporting member 32. The head 60 is installed on the slider 50. A flexure 30 is placed between the slider supporting member 32 and the load beam 20 in an extending manner. A thin-film piezoelectric unit 40 is bonded to the flexure 30. The slider supporting member 32 is bonded to a flexure top **33*f* located on the further edge side from the portion on which the thin-film piezoelectric unit 40** is bonded.

The slider supporting member 32 is allowed to pivot around the protrusion 28 serving as the center of pivotal movements by the extending and contracting operations of the thin-film piezoelectric unit 40. The flexure 30 is joined to the load beam 20 except the portions on which the thin-film piezoelectric unit 40 and the slider supporting member 32 are bonded. Wires related to the head 60 and the thin-film piezoelectric unit 40 are formed on the flexure 30.

Hereinafter, detailed explanations will be given of the respective parts.

As illustrated in FIG. 1 and FIG. 2, the load beam 20 is provided with a base end 21 that is secured to the base plate 10 having a short rectangular shape, through, for example, a beam welding process, a neck portion 22 extended from the base end 21 in a manner so as to be narrowed toward the top, an opening section 23 formed in the center on the neck portion 22, a beam main section 24 extended linearly in a manner so as to connect to the neck portion 22 and to be narrowed toward the top, a supporting section 25 connecting to the top of the beam main section 24, and a pair of regulating sections **26*a* and 26*b* that are allowed to rise on both of the right and left sides of the supporting section 25. Portions on both of the sides of the opening section 23 in the neck section 22 is constituted by a pair of plate spring sections 27*a* and 27*b*. A protrusion 28 is integrally formed virtually on the central portion of the supporting section 25. The pair of regulating sections 26*a* and 26*b* are linearly extended toward the base end 21 from the top of the supporting section 25** in parallel with each other.

Figure 4:
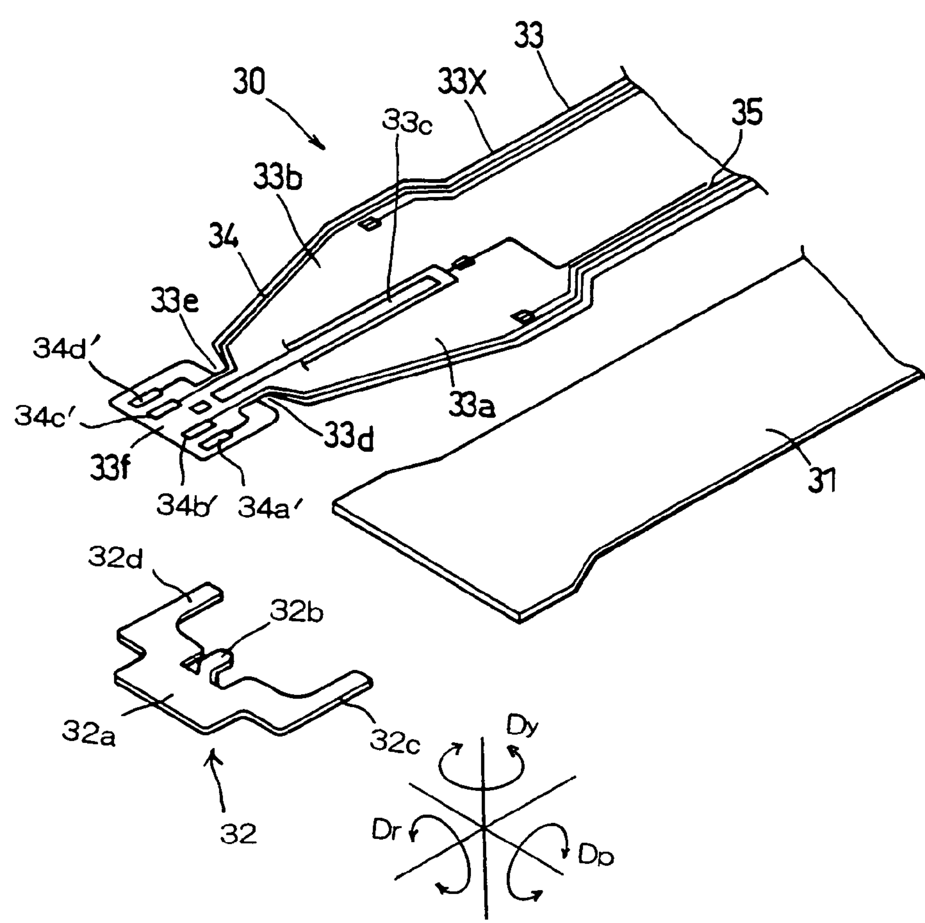
FIG. 4 is a perspective view that shows a structure of a flexure of the head supporting mechanism in an exploded manner in accordance with the embodiment of the present invention.

As illustrated in FIG. 4, the flexure 30 has five members as its main constituent elements, that is, a flexure substrate 31, a slider supporting member 32, a flexible wiring substrate 33 connecting these flexure substrate 31 and slider supporting member 32, a head-use wire 34 provided on the wiring substrate 33 as a patterned wire and a thin-film piezoelectric member-use wire 35. The flexure substrate 31 and the slider supporting member 32 are made of metal, or more preferably, stainless steel. The wiring substrate 33 is constituted by an insulating film made of a polyimide resin, etc. The head-use wire 34 and the piezoelectric member-use wire 35 are patterned on the wiring substrate 33.

Figure 8:
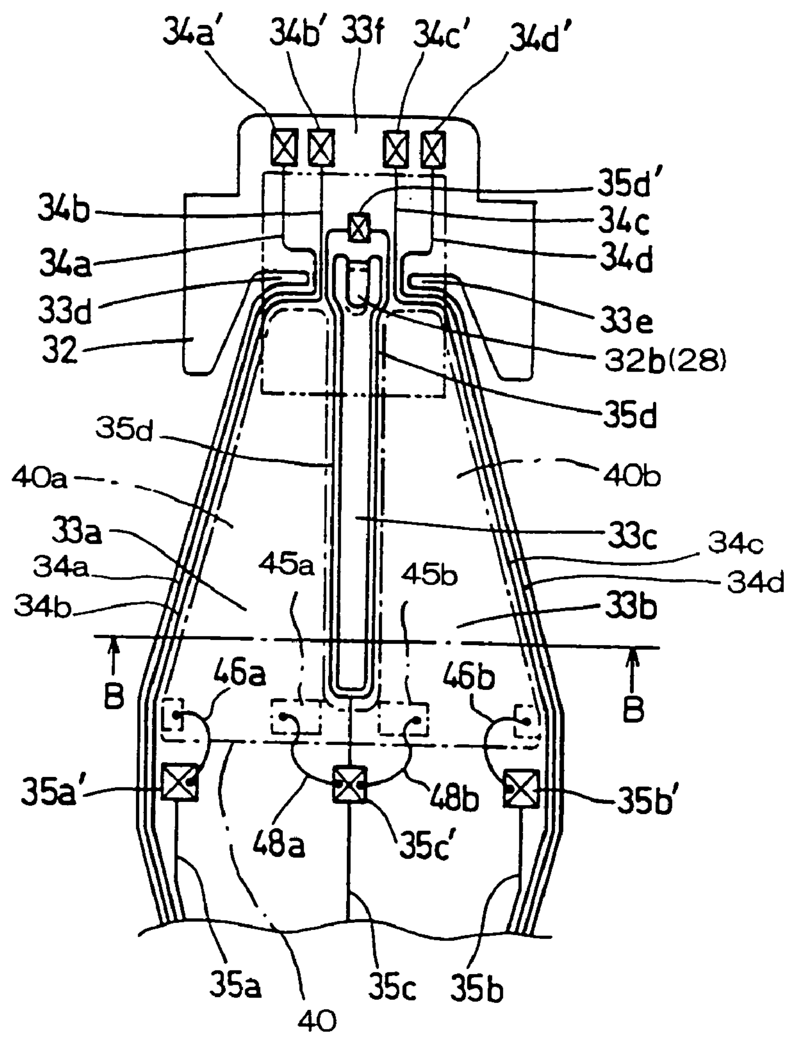
FIG. 8 is a plan view that shows the top portion of the flexure in the head supporting mechanism in accordance with the embodiment of the present invention.

There are three types of piezoelectric member-use wires 35. Referring to FIG. 8, these are explained. FIG. 8 shows the wiring substrate 33 and the slider supporting member 32 without discriminating these members. With respect to the constituent elements of the piezoelectric member-use wire 35, one is a first piezoelectric member-use wire **35*a*, another is a second piezoelectric member-use wire 35*b* and the other is a third piezoelectric member-use wire 35*c*. Besides these, a pair of ground wires 35*d* for setting the slider 50** to the ground level are placed.

As illustrated in FIG. 2, the wiring substrate 33 in the flexure 30 is provided with a flexible substrate main section 33X that is joined to the beam main section 24 of the load beam 20 except its top side, an external connecting terminal holding section 33Y that is joined to the base end 21 of the load beam 20 and a connecting section 33Z that couples the substrate main section 33X and the terminal holding section 33Y into a crank shape all of which are integrally arranged.

As illustrated in FIG. 4 and FIG. 8, the substrate main section 33X in the wiring substrate 33 is provided with tong-shaped piezoelectric member supporting portions **33*a* and 33*b*, a slit 33*c* located between these, a pair of elastic hinge portions 33*d* and 33*e* that are respectively formed on the top sides of the piezoelectric member supporting portions 33*a* and 33*b*, each having a locally thin width with a necked shape, and a flexure top end 33*f* for connecting the two members on further end sides of elastic hinge portions 33*d* and 33*e*, all of which are integrally arranged. The slit 33*c* is extended from the area of the piezoelectric ember supporting sections 33*a*, 33*b* to the flexure top end 33*f*. Including the elastic hinge portions 33*d* and 33*e*, the entire wiring substrate 33 is made from a polyimide resin, etc., so that it also serves as an insulating film for the head-use wire 34 and the piezoelectric device-use wire 35**.

The pair of elastic hinge portions **33*d* and 33*e* are placed at positions that are symmetrical with respect to the center line along the length direction of the load beam 20. More specifically, the pair of elastic hinge portions 33*d* and 33*e* are placed on a straight line in a right-angle direction with respect to the center line of the load beam 20, which passes through the protrusion 28 of the load beam 20**.

As illustrated in FIG. 8, the head-use wire 34, patterned on the wiring substrate 33, includes a first head wire **34*a* and a second head wire 34*b* that are placed along the left side and a third head wire 34*c* and a fourth head wire 34*d* that are placed along the right side. These wires are extended to the flexure top end 33*f* where they respectively form lands 34*a*', 34*b*', 34*c*' and 34*d*'**.

A first head wire **34*a* and a second head wire 34*b* are placed on the outside edge of the piezoelectric supporting portion 33*a* on the left side, and a ground wire 35*d* is placed along the slit 33*c* on the inner edge. The first and second head wires 34*a* and 34*b* are respectively extended to the flexure top portion 33*f* where they respectively form lands 34*a*' and 34*b*'. Moreover, a third head wire 34*c* and a fourth head wire 34***d* are placed on the outside edge of the piezoelectric supporting portion 33*b* on the right side, and a ground wire 35*d* is placed along the slit 33*c* on the inner edge. The third and fourth head wires 34*c* and 34*d* are respectively extended to the flexure top portion 33*f* where they respectively form lands 34*c*' and 34*d*'.

As illustrated in FIG. 8, the land 35*c*' of the third piezoelectric member-use wire 35*c* is placed in the vicinity of the inner side end of the slit 33*c*, and the land 35*a*' of the first piezoelectric member-use wire 35*a* and the land 35*b*' of the second piezoelectric member-use wire 35*b* are placed on the right and left sides of the land 35*c*' in a symmetrical fashion. The land 35*d*' of the ground wire 35*d* is placed in the vicinity of the top end side of the slit 33*c* from which it passes through both of the sides of the slit 33*c*, and is connected to the land 35*c*' of the third piezoelectric device-use wire 35*c*.

As illustrated in FIG. 4, in its manufacturing process, the flexure 30, constituted by the flexure substrate 31, the slider supporting member 32 and the wiring substrate 33, is molded onto a stainless steel plate that is an original form of the flexure substrate 31 and the slider supporting member 32, in a manner so as to coat the head-use wire 34 and the piezoelectric member-use wire 35. After the molding process, a trimming process is carried out on the stainless steel plate through etching to form the flexure substrate 31 and the slider supporting member 32. Consequently, in its shape, the flexure substrate 31 and the slider supporting member 32 are connected to each other through the wiring substrate 33.

For convenience of explanation, with respect to the slider 50, a pitching direction Dp, a rolling direction Dr and a yawing direction Dy are given in FIG. 1 and FIG. 4.

The pitching direction Dp represents a rocking direction around the axis in the width direction of the load beam 20, the rolling direction Dr represents a rocking direction around the axis in the length direction of the load beam 20, and the yawing direction Dy is a rocking direction around the axis in the normal direction in the load beam 20.

The slider supporting member 32, which is connected to the flexure substrate 31 through the flexible wiring substrate 33, that is, in particular, through the pair of elastic hinge portions 33*d* and 33*e* and the flexure top portion 33*f*, is maintained in flexible states in both of the pitching direction Dp and the rolling direction Dr. Consequently, the slider supporting member 32 and the slider 50 located thereon are allowed to have a degree of freedom in the pitching direction Dp and the rolling direction Dr.

In this manner, the slider 50 is arranged so as to freely move in the pitching direction Dp as well as in the rolling direction Dr; therefore, even when the surface of the magnetic disk 70 that rotates at high speeds is in a waving state, it is possible to provide a sufficiently good floating characteristic of the slider 50 with respect to the surface of the magnetic disk 70.

With respect to the slider 50 that moves freely in either of the pitching direction Dp and rolling direction Dr, it is essential to allow it to smoothly rotate for tracking compensation by utilizing its free movements. This direction of pivotal movements is the yawing direction Dy. It is essential how to allow the yawing of the slider 50 to make a high-speed response to the tracking compensation, while maintaining free pitching and rolling of the slider 50.

Figure 5:
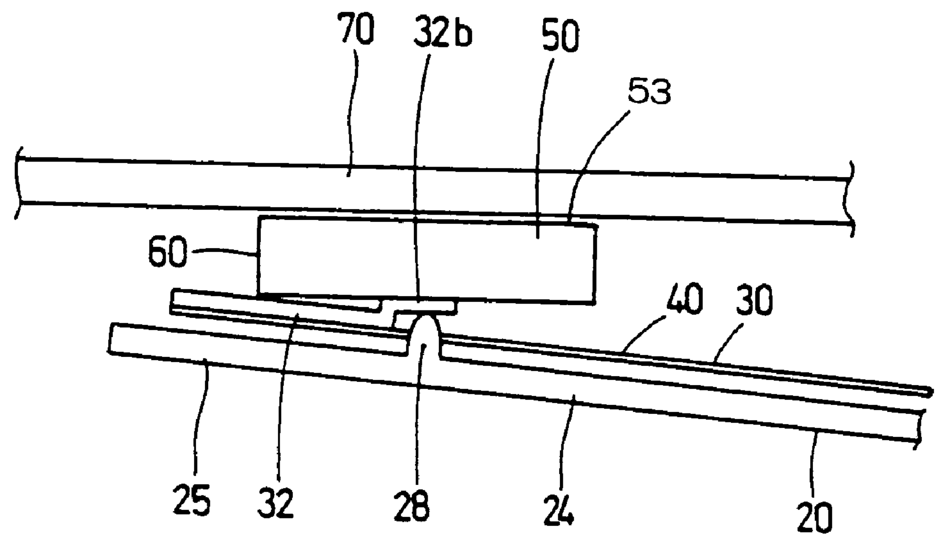
FIG. 5 is a side view that shows the slider portion in the head supporting mechanism in an enlarged manner, in accordance with the embodiment of the present invention.
Figure 12A:
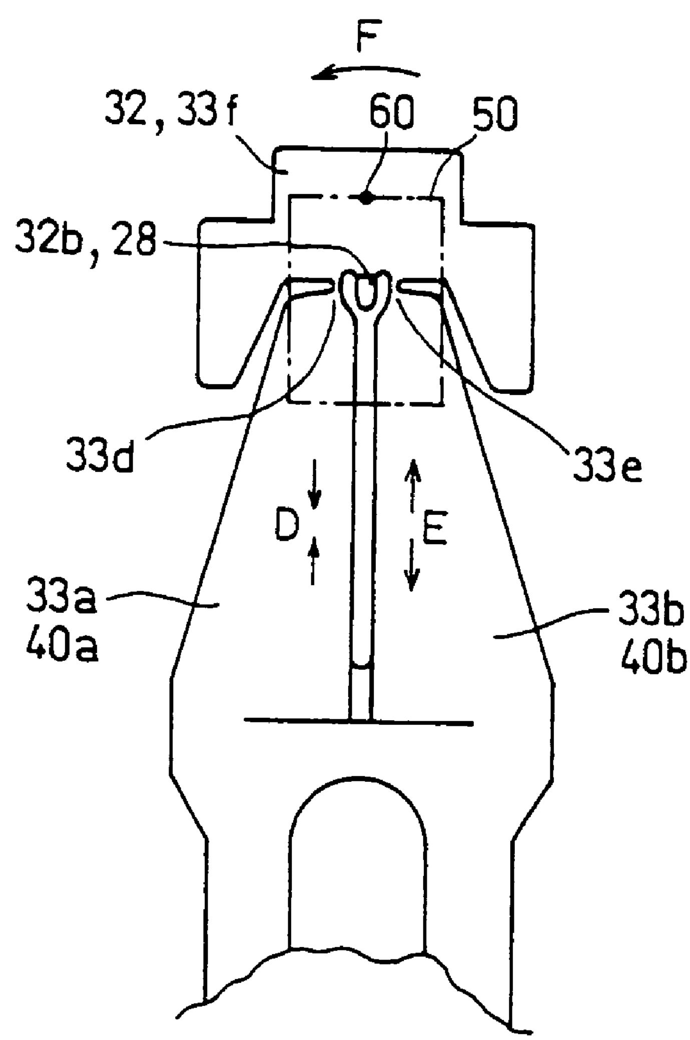
FIG. 12A is a plan view that explains the operation of the head supporting mechanism in accordance with the embodiment of the present invention.

The protrusion 28 on the load beam 20 that forms the center of pivotal movements of the slider supporting member 32 and the slider 50 is set to be located within the area range of the slider supporting member 32, as illustrated in FIG. 8, FIG. 5 and FIG. 12A.

As illustrated in FIG. 4 and FIG. 5, the slider supporting member 32 is constituted by a main section 32*a* connected to the flexure top portion 33*f*, a slider center-of-gravity supporting portion 32*b* for fixing the slider 50 on its center of gravity or in the vicinity thereof by being bent from the center of the back edge of the main section 32*a*, and a pair of right and left mass balancing sections 32*c* and 32*d* for providing a well balanced state of the main section 32*a* with respect to the slider center-of-gravity portion 32*b*. The slider center-of-gravity holding portion 32*b* is allowed to stick out through the slit 33*c* of the flexure 30 from the lower side to the upper side, with its lower face contacting the protrusion 28 of the load beam 20. The slider supporting member 32 the entire portion thereof is made of a sheet of metal plate, and the slider center-of-gravity holding portion 32*b* is formed by bending processes in the form of steps. This slider center-of-gravity holding portion 32*b* is allowed to stick out in the normal direction from the reference face of the slider supporting member 32.

A pair of mass balancing portions 32*c* and 32*d* are installed so as to connect to the slider supporting member 32, and the following description will discuss the advantage of this structure.

The flexure top portion 33*f* is provided with the lands 34*a*', 34*b*', 34*c*' and 34*d*' that are connected to the electrode terminals 52*a*, 52*b*, 52*c* and 52*d* of the slider 50. Therefore, the flexure top portion 33*f* needs to be reinforced. For this reason, the flexure top portion 33*f* is supported by the slider supporting member 32. However, it is not preferable to allow the slider supporting member 32 to contact the piezoelectric member supporting portions 33*a* and 33*b*. The slider supporting member 32 needs to freely move with respect to the piezoelectric member supporting portions 33*a* and 33*b*. FIG. 13A shows a simple solution for this arrangement.

Figure 13B:
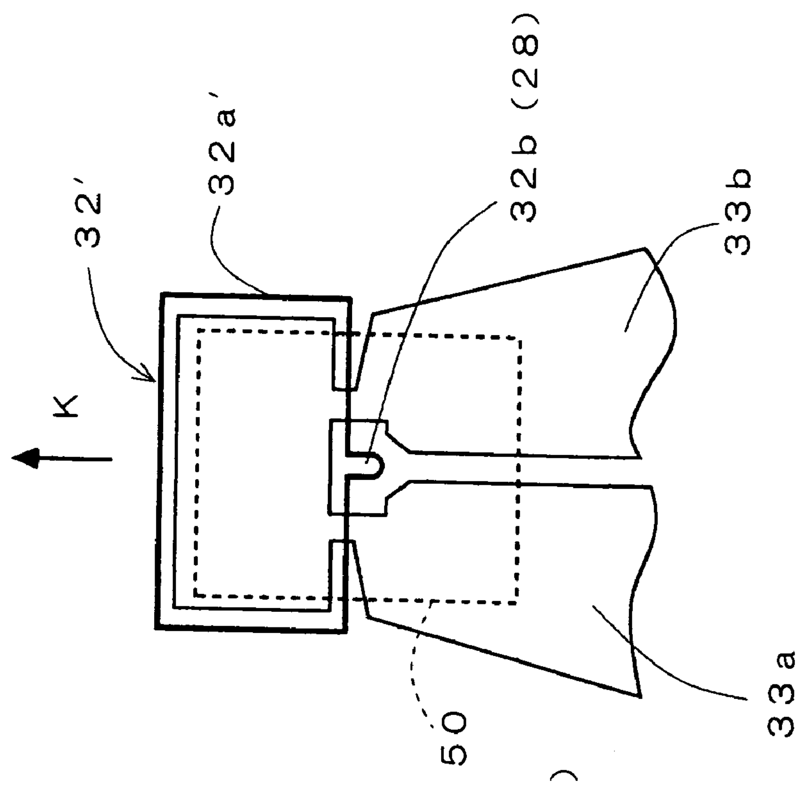
FIG. 13B is a schematic plan view that shows a comparative example in which the mass balancing portion is omitted.
Figure 13A:
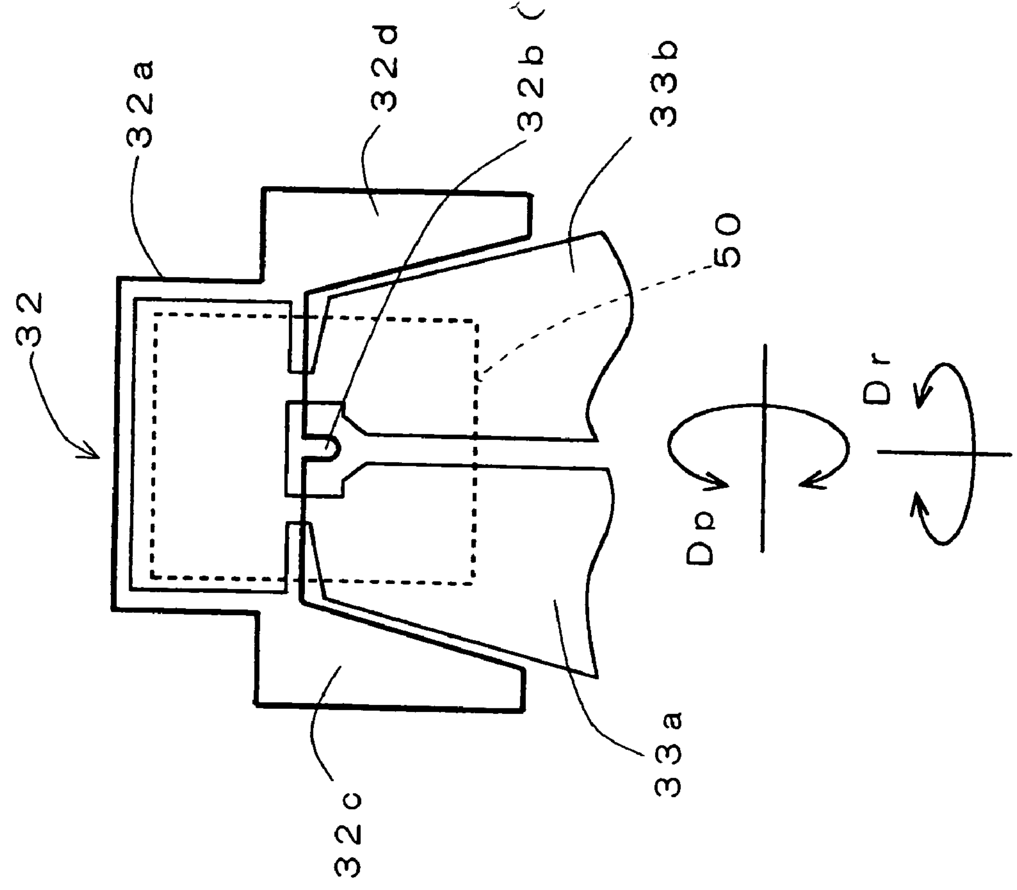
FIG. 13A is a schematic plan view that explains the advantage of a mass balancing portion in the head supporting mechanism in accordance with the embodiment of the present invention.

FIG. 13B shows a comparative example. In FIG. 13B, reference numeral 32*a*' is a main section having a short rectangular shape and 32*b* is a slider center-of-gravity holding section. This shape satisfies the condition that the slider supporting member 32' is not allowed to contact the piezoelectric member supporting portions 33*a* and 33*b*.

Since the slider 50 has its center of gravity supported by the protrusion 28, the slider 50 is well balanced in its mass with respect to the protrusion 28. However, in the case of a comparative example of FIG. 13B, it is not well balanced in its mass in the yawing direction Dy and the pitching direction Dp, centered on the protrusion 28. The mass is biased toward the side in the K direction with respect to the protrusion 28. Since the slider 50 and the slider supporting member 32' are allowed to pivot integrally, the mass balance needs to be properly set as a whole. Otherwise, the parallel property of the slider 50 with respect to the magnetic disk 70 is impaired.

In order to ensure a well-balanced state in its mass in either of the pitching direction Dp and the rolling direction Dr with respect to the protrusion 28 and to prevent the protrusion 28 from contacting the piezoelectric member supporting portions 33*a* and 33*b*, a slider supporting member 32 having a shape as shown in FIG. 13A is proposed. In this arrangement, the mass balancing portions 32*c* and 32*d* are extended from the main section 32*a* symmetrically in its right and left shapes. They are extended from the main section 32*a* outwards in the right and left directions, and also extended toward the base end side of the load beam 20. The mass balancing portions 32*c* and 32*d* are maintained so as not to contact the piezoelectric member supporting portions 33*a*, 33*b*; thus, it is possible to ensure free well-balanced movements of the slider supporting member 32 and the slider 50 around the protrusion 28 as the center of pivotal movements.

Figure 6:
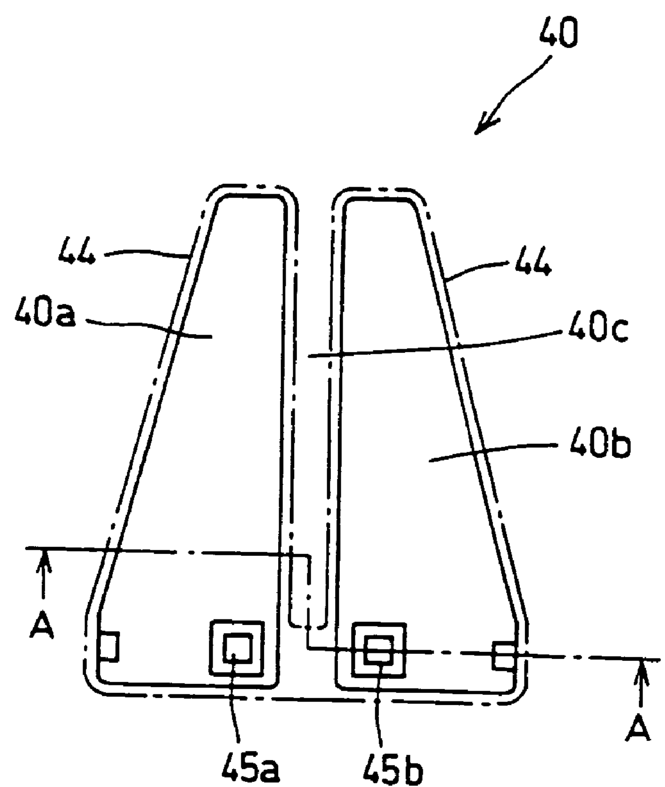
FIG. 6 is a plan view that shows a thin-film piezoelectric unit in the head supporting mechanism in accordance with the embodiment of the present invention.

Next, an explanation will be given of the thin-film piezoelectric member unit 40. As illustrated in FIG. 6, the thin-film piezoelectric member unit 40 is provided with a first thin-film piezoelectric element 40*a* and a second thin-film piezoelectric element 40*b* that have a tong shape with their bases connected to each other, and a slit 40*c* is formed between these thin-film piezoelectric elements 40*a* and 40*b*. Here, a specific structure of this thin-film piezoelectric member unit 40 will be described later in detail.

Figure 3:
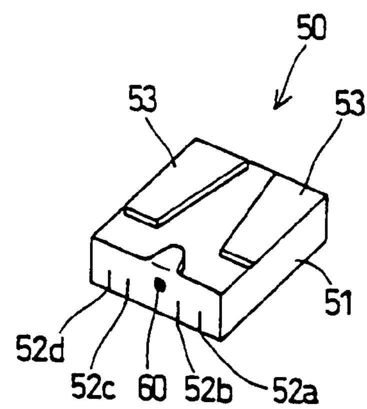
FIG. 3 is a perspective view that shows a slider of the head supporting mechanism in accordance with the embodiment of the present invention.

As illustrated in FIG. 3, the slider 50 has a slider main body 51 made of ceramics on which the head 60 is installed with four electrode terminals 52*a*, 52*b*, 52*c* and 52*d* connected to the head 60 being embedded in column shapes. Here, one portion thereof is exposed to the surface. With respect to the head 60, for example, a composite-type magnetic head, which is constituted by a reproducing head consisting of an MR head or a GMR head utilizing the magnetic resistance effect and a recording head consisting of an inductive head, may be used.

The upper face of the slider main body 51 is formed as an air bearing face 53. The air bearing face 53 is arranged so that an air flow, generated by the high-speed rotations of the magnetic disk 70 (see FIG. 5), is applied along the pitching direction (tangential direction of the magnetic disk) of the slider 50 to form an air lubricating film between it and the magnetic disk 70. This air lubricating film allows the slider 50 to float over the surface of the magnetic disk 70 with a minute gap.

Thus, explanations have been completed on the respective constituent elements such as the base plate 10, the load beam 20, the flexure 30, the thin-film piezoelectric member unit 40, the slider 50 and the head 60.

Next, explanations will be given of mutual relationships among the respective constituent elements.

As illustrated in FIG. 1 and FIG. 2, the load beam 20 is integrally secured to the base plate 10 in its base end 21 through a beam welding, etc. The flexure 30 is integrally secured to the load beam 20 except its top portion through a beam welding or a bonding agent.

As illustrated in FIG. 1 (also see FIG. 2), the terminal holding section 33Y of the flexure 30 is secured to the base end 21 of the load beam 20, the substrate main section 33X is secured to the beam main section 24 except a portion corresponding to the thin-film piezoelectric member unit 40 on its top end side, and the flexure top portion 33*f* is placed on the supporting section 25. At this time, a pair of right and left piezoelectric supporting portions 33*a*, 33*b* in the flexure 30 are not secured to the beam main section 24. Thus, the pair of piezoelectric supporting portions 33*a*, 33*b* are maintained free without being secured so that the displacement (extension and contraction) of these piezoelectric supporting portions 33*a*, 33*b* is freely allowed. The displacement is generated by the first and second thin-film piezoelectric member units 40*a* and 40*b*. The slider supporting member 32 and the flexure top portion 33*f* are not secured to the beam main section 24.

Moreover, as illustrated in FIG. 5, the protrusion 28 of the load beam 20 is allowed to contact the slider center-of-gravity portion 32*b* that has been bent into a stepped shape in the slider supporting member 32. To the load beams 20 are applied pressing forces exerted by the plate spring portions 27*a* and 27*b* on its base end side in the normal direction. These pressing forces are exerted on the slider center-of-gravity holding portion 32*b* from the protrusion 28. On the other hand, the slider 50 is pressed toward the slider supporting member 32 by the air flow on the surface of the magnetic disk 70 being rotated at high speeds. As a result, the protrusion 28 and the slider center-of-gravity holding portion 32*b* are allowed to make a point contact with each other, and with respect to the relative shift, a frictional force is exerted. The protrusion 28 of the load beam 20 is allowed to stick out upward from the lower side through the slit 33*c* between the pair of right and left piezoelectric member supporting portions 33*a* and 33*b*.

Figure 9A:
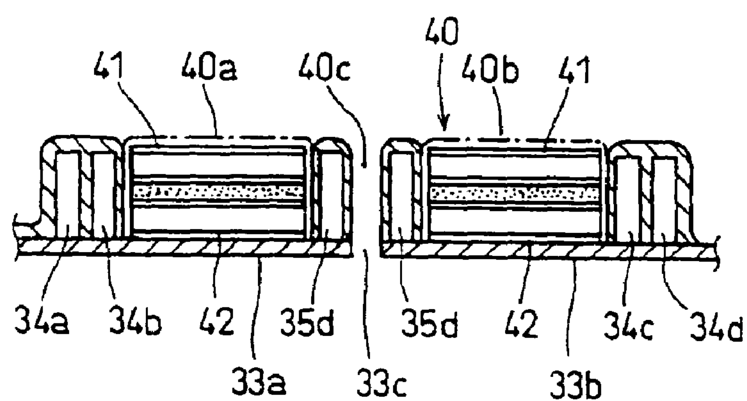
FIG. 9A is a cross-sectional view taken along line B—B in FIG. 8.
Figure 9B:
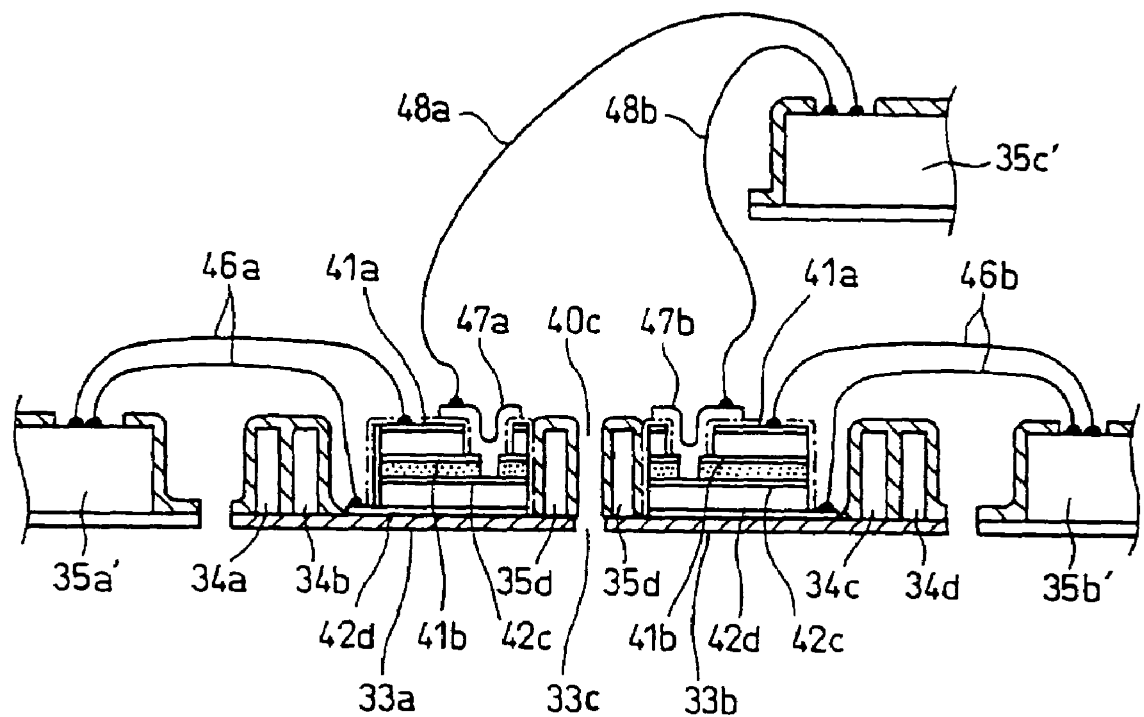
FIG. 9B is a cross-sectional view that is irregularly cut so as to clearly show the wiring state of FIG. 8.

As illustrated in FIG. 9A and FIG. 9B, a pair of right and left thin-film piezoelectric elements 40*a* and 40*b* of the thin-film piezoelectric member unit 40 are integrally bonded to the pair of right and left piezoelectric member supporting portions 33*a* and 33*b*. With respect to the wiring connection to the thin-film piezoelectric member unit 40, the description thereof will be given later.

The slider 50 bearing the head 60 is integrally bonded and secured to the step-shaped slider center-of-gravity holding portion 32*b* of the slider supporting member 32 and the flexure top portion 33*f* (see FIG. 5). The front end lower edge of the slider 50 is bonded to the flexure top portion 33*f*, and the geometric center of the lower face of the slider 50, that is, the center of gravity, is bonded to the upper face of the step-shaped slider center-of-gravity portion 32*b*. The electrode terminals 52*a*, 52*b*, 52*c* and 52*d* (see FIG. 3) of the slider 50 are electrically connected to the lands 34*a*', 34*b*', 34*c*', and 34*d*' (see FIG. 4 and FIG. 8) in the flexure top portion 33*f*.

Figure 10:
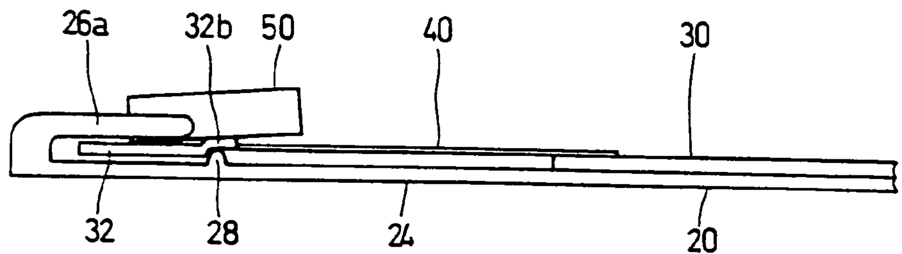
FIG. 10 is a side view that shows the head supporting mechanism in accordance with the embodiment of the present invention.

As illustrated in FIG. 1, the slider supporting member 32 is inserted between a pair of right and left regulating sections 26*a*, 26*b* on the top portion of the load beam 20, and regulated in its position so that the protrusion 28 and the slider center-of-gravity holding portion 32*b* are not separated greatly from each other (see FIG. 10).

The slider 50, the slider supporting member 32 and the flexure top portion 33*f* are integrally formed as a subject of pivotal movements. This subject of pivotal movements is allowed to pivot around the protrusion 28 of the load beam 20 as the center of pivotal movements, with being elastically deformed at the portions of elastic hinge portions 33*d* and 33*e* each having a necked shape.

Figure 7:
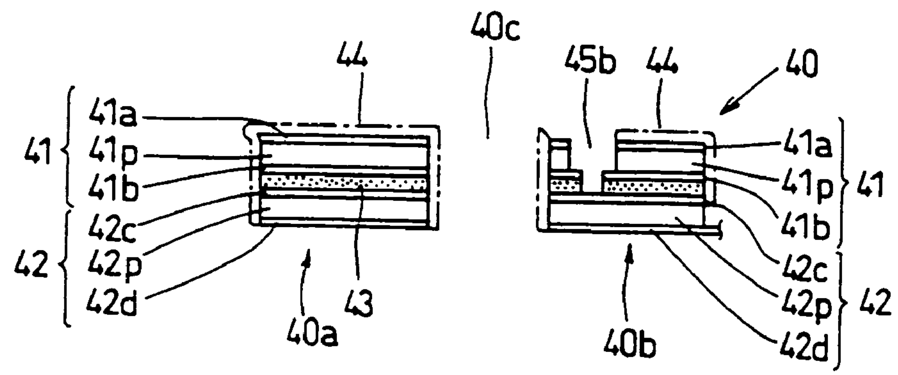
FIG. 7 is a cross-sectional view taken along line A—A in FIG. 6.

Next, an explanation will be given of a specific structure of the thin-film piezoelectric member unit 40. FIG. 6 is a plan view showing the thin-film piezoelectric member unit 40. FIG. 7 is a cross-sectional view taken along line A—A in FIG. 6. For convenience of explanation, in FIG. 7, the scale in the thickness direction is set to be greater than the actual scale.

The thin-film piezoelectric member unit 40 is provided with a first thin-film piezoelectric element 40*a* and a second thin-film piezoelectric element 40*b* that are provided as right and left portions connected only at their foots with a tong shape through a slit 40*c*.

The first thin-film piezoelectric element 40*a* and the second thin-film piezoelectric element 40*b* are the same in their structure. The structure is explained as follows: An upper thin-film piezoelectric element 41 and a lower thin-film piezoelectric element 42 are stacked, and integrally joined to each other through a conductive bonding agent 43. The upper thin-film piezoelectric element 41 is formed by integrally forming a first electrode 41*a* and a second electrode 41*b* on both of the surfaces of a thin-film piezoelectric member 41*p*, and in the same manner, the lower thin-film piezoelectric member 42 is formed by integrally forming a third electrode 42*c* and a fourth electrode 42*d* on both of the surfaces of a thin-film piezoelectric member 42*p*. These electrodes are made of metal thin films. The conductive bonding agent 43 is interpolated between the second electrode 41*b* and the third electrode 42*c* so that these two electrodes are integrally joined.

Here, the right and left thin-film piezoelectric elements 40*a* and 40*b* are entirely coated with a flexible coating resin 44 into an integral member.

FIG. 9A is a cross-sectional view taken along line B—B in FIG. 8. FIG. 9B is a cross-sectional view that is irregularly cut so as to clearly show the wiring state of FIG. 9B.

As illustrated in FIG. 6, FIG. 7, FIG. 8 and FIG. 9B, connecting holes 45*a* and 45*b* are respectively formed on the base portions of the right and left thin-film piezoelectric elements 40*a* and 40*b*, and these connecting holes 45*a* and 45*b* are filled with ground metal films 47*a* and 47*b* for electrically connecting the second electrode 41*b* and the third electrode 42*c*.

As illustrated in FIG. 9A and FIG. 9B, the first thin-film piezoelectric elements 40*a* and the second thin-film piezoelectric elements 40*b* are placed on the piezoelectric supporting portions 33*a* and 33*b* of the wiring substrate 33 in the flexure 30, and integrally joined to each other by an adhesive agent.

In FIG. 8, the thin-film piezoelectric member unit 40 is indicated by a chain line. The first thin-film piezoelectric element 40*a* on the left side is placed between the first and second head wires 34*a*, 34*b* and the ground wire 35*d*. Moreover, the second thin-film piezoelectric element 40*b* on the right side is placed between the third and fourth head wires 34*c*, 34*d* and the ground wire 35*d*.

As illustrated in FIG. 8 and FIG. 9B, in the first thin-film piezoelectric element 40*a* on the left side, the first electrode 41*a* on the upper side of the upper thin-film piezoelectric element 41 and the fourth electrode 42*d* on the lower side of the lower thin-film piezoelectric element 42 are connected to the land 35*a*' of the first piezoelectric member-use wire 35*a* respectively through a wire bond line 46*a*. Moreover, in the second thin-film piezoelectric element 40*b* on the right side, the first electrode 41*a* on the upper side of the upper thin-film piezoelectric element 41 and the fourth electrode 42*d* on the lower side of the lower thin-film piezoelectric element 42 are connected to the land 35*b*' of the second piezoelectric member-use wire 35*b* respectively through a wire bond line 46*b*.

Figure 11A:
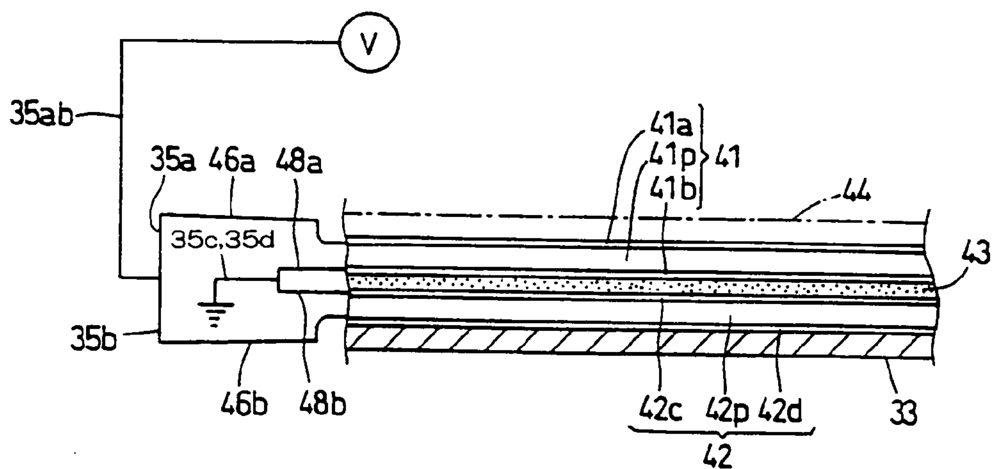
FIG. 11A is an explanatory view that shows driving system of a thin-film piezoelectric unit in the head supporting mechanism in accordance with the embodiment of the present invention.

A positive voltage is applied to the first piezoelectric member-use wire 35*a* and the second piezoelectric member-use wire 35*b* (see FIG. 11A). Therefore, in the thin-film piezoelectric elements 40*a*, 40*b*, of the two electrodes that sandwich the thin-film piezoelectric members 41*p* and 42*p*, the positive voltage is applied to the first electrode 41*a* and the fourth electrode 42*d* that are located on both of the outer sides.

In the right and left thin-film piezoelectric elements 40*a* and 40*b* of the thin-film piezoelectric member unit 40, ground metal films 47*a*, 47*b* are formed in the respective connecting holes 45*a* and 45*b* (see FIG. 6 and FIG. 8) by being filled therein, and through these ground metal films 47*a*, 47*b*, the second electrodes 41*b* on the lower side of the upper thin-film piezoelectric element 41 and the third electrode 42*c* on the upper side of the lower thin-film piezoelectric element 42 are connected to each other in a short-circuiting manner. Moreover, the ground metal films 47*a*, 47*b* are connected to the land 35*c*' of the third piezoelectric member-use wire 35*c* through the respective wire bonds lines 48*a*, 48*b* (see FIG. 8 and FIG. 9B). The third piezoelectric member-use wire 35*c* is connected to the ground. Therefore, in the thin-film piezoelectric elements 40*a*, 40*b*, of the two electrodes that sandwich the thin-film piezoelectric members 41*p* and 42*p*, the ground voltage is applied to the second electrode 41*b* and the third electrode 42*c* that are located on both of the inner sides (see FIG. 11A).

As illustrated in FIG. 2, the head-use wire 34 consisting of the first head wire 34*a*, the second head wire 34*b*, the third head wire 34*c* and the fourth head wire 34*d* is extended from the connecting portion 33Z having a crank shape further to the terminal holding section 33Y, and connected to an external connecting land 36 formed on the terminal holding section 33Y. Moreover, the piezoelectric member-use wire 35 consisting of the first piezoelectric member-use wire 35*a*, the second piezoelectric member-use wire 35*b*, the third piezoelectric member-use wire 35*c* and the ground wire 35*d* is extended from the connecting portion 33Z further to the terminal holding section 33Y, and connected to an external connecting land 37 formed on the terminal holding section 33Y. The external connecting lands 36 and 37 are connected to an external driving circuit (not shown).

As illustrated in FIG. 11A, the first piezoelectric member-use wire 35*a* and the second piezoelectric member-use wire 35*b* are connected to a common high electric potential side driving wire 35*ab*, and connected to a high electric potential side power supply terminal in a power-supply circuit (not shown) through the land 37 in the terminal holding section 33Y. The third piezoelectric member-use wire 35*c* is connected to the ground in the power-supply circuit through the land 36 in the terminal holding section 33Y.

Next, an explanation will be given to an attaching process of the slider 50 to the flexure 30. The slider 50 is attached to the slider supporting member 32 on the top end of the flexure 30, and the geometric center of the lower face of the slider 50, that is, the center of gravity, is allowed to contact the step-shaped slider center-of-gravity holding portion 32*b* in the slider supporting member 32, and the front end lower edge of the slider 50 is allowed to contact the flexure end portion 33*f* on the slider supporting member 32; thus, these members are integrally joined and secured to the contact portions through an adhering agent. Lands 34*a*', 34*b*', 34*c*' and 34*d*' on the flexure top portion 33*f* in the end of the head-use wire 34 and the electrode terminals 52*a*, 52*b*, 52*c* and 52*d* of the slider 50 used for making connections to the head 60 are connected to each other electrically as well as physically through a conductive bonding agent, etc.

By interpolating the sliding supporting member 32 having the slider center-of-gravity holding portion 32*b* between the load beam 20 and the slider 50, the following advantages can be obtained.

The alternation in a specification of the magnetic disk apparatus sometimes causes a difference in the relative orientation angle of the slider 50 with respect to the magnetic disk 70, in particular, in the inclination in the pitching direction. Not providing a solution for each of the specifications, the load beam 20 and slider 50 are set as commonly-used components and the dimension of the step difference and the like of the slider center-of-gravity holding portion 32*b* that has been subjected to bending processes into a stepped shape is adjusted in the slider supporting member 32 so that the inclination angle in the pitching direction of the slider 50 is properly set; thus, it is possible to easily respond to the variations in a plurality of specifications.

Next, an explanation will be given of the operation of the head supporting mechanism 100 in the preferred embodiment having the above-mentioned arrangement.

Figure 11B:
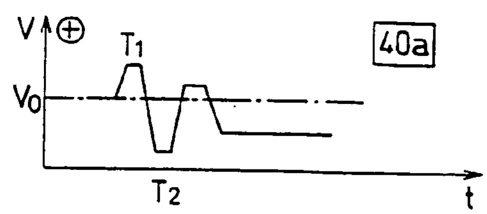
FIG. 11B is a waveform diagram of an applied voltage to one of thin-film piezoelectric elements of the thin-film piezoelectric unit in the head supporting mechanism in accordance with the embodiment of the present invention.
Figure 11C:
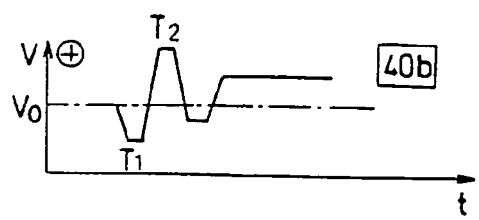
FIG. 11C is a waveform diagram of an applied voltage to the other thin-film piezoelectric element of the thin-film piezoelectric unit in the head supporting mechanism in accordance with the embodiment of the present invention.

FIG. 11B and FIG. 11C show examples of waveforms of voltages that are applied to the first thin-film piezoelectric element 40*a* on the left side and the second thin-film piezoelectric element 40*b* on the right side in a tracking compensation control in which in the case of off-track of the head 60 from a target track, the returning process to the target track is carried out. Vo represents a bias voltage that is equally applied to both of the right and left thin-film piezoelectric elements 40*a*, 40*b* while the head 60 is maintained on the target track.

In a tracking compensation control in the case of off-track of the head 60, voltages having mutually reversed phases are applied to the first thin-film piezoelectric element 40*a* and the second thin-film piezoelectric element 40*b*.

Pre-format information signals, such as a tracking-use servo signal, an address information signal and a reproducing clock signal, are preliminarily recorded on the magnetic disk 70. The head 60, which faces the magnetic disk 70 rotating at a high speed with a fine gap, reproduces the pre-format information signals, and transmits these to the head positioning control section 8 shown in FIG. 19. The head positioning control section 8 carries out predetermined operations based upon the tracking-use servo signal, generates a driving signal for the tracking compensation, and transmits this to the two thin-film piezoelectric elements 40*a* and 40*b*. Thus, voltages having mutually reversed polarities with respect to the bias voltage Vo as a reference are applied to the two thin-film piezoelectric elements 40*a* and 40*b*.

When the head 60 has a positional deviation from the target track in the radial direction outside the magnetic disk 70, the voltage control is carried out in such a manner that, in period $T_1$ shown in FIG. 11B and FIG. 11C, the applied voltage to the first thin-film piezoelectric element 40*a* increases with respect to the bias voltage Vo and in synchronism with this, the applied voltage to the second thin-film piezoelectric element 40*b* reduces with respect to the bias voltage Vo. Thus, the head 60 is returned inside in the radial direction. Here, the head 60 is further displaced inside in the radial direction, exceeding the target track due to an overshoot at this time. Then, the controlling operation proceeds to an operation during period $T_2$.

In period $T_2$, the voltage control is carried out in such a manner that in a manner reversed to period $T_1$, the applied voltage to the first thin-film piezoelectric element 40*a* reduces with respect to the bias voltage Vo, and in synchronism with this, the applied voltage to the second thin-film piezoelectric element 40*b* increases with respect to the bias voltage Vo. Thus, the head 60 is returned outside in the radial direction.

Figure 12B:
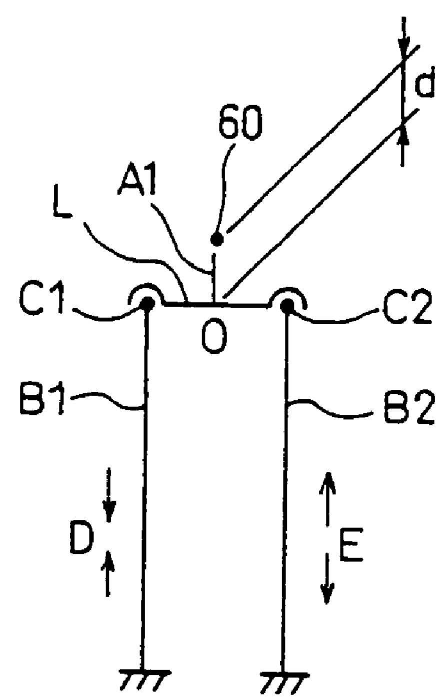
FIG. 12B is a drawing that explains the principle of the operation of the head supporting mechanism in accordance with the embodiment of the present invention.

FIG. 12B schematically shows the structure shown in FIG. 12A. The piezoelectric member supporting portion 33*a* on the left side and the first thin-film piezoelectric element 40*a* form a first beam B1, the piezoelectric member supporting portion 33*b* on the right side and the second thin-film piezoelectric element 40*b* form a second beam B2, the slider supporting member 32 and the flexure top portion 33*f* constitute a link L, the protrusion 28 and the step-shaped slider center-of-gravity portion 32*b* constitute the center O of pivotal movements of the link L, the slider 50 forms an arm A1 that is an integral member with the link L having a length d, and the head 60 is located at the top of the arm A1.

The link L is allowed to freely pivot relatively on both of its ends with respect to the first beam B1 and the second beam B2. This movement is exerted by the elastic hinge portions 33*d* and 33*e* having a necked shape. The elastic hinge portions 33*d* and 33*e* constitute rocking fulcrums C1 and C2. The elastic hinge portions 33*d* and 33*e* have flexible structures in the pitching direction Dp, the rolling direction Dr and the yawing direction Dy of the slider 50, thereby giving a desired floating characteristic to the slider 50 with respect to the magnetic disk 70. Both of the beams B1 and B2 constitute a translational link mechanism. Here, the link mechanism constituted by the two beams B1 and B2 are not necessarily limited to parallel links, and the parallelism of the two beams B1 and B2 is not essential as long as the two beams B1 and B2 are symmetrical.

For example, as shown in FIG. 12A, during period $T_1$, in the case when the first thin-film piezoelectric element 40*a* contracts in the direction of arrow D in its length direction, the second thin-film piezoelectric element 40*b* is allowed to extend reversely in the direction of arrow E. During period $T_2$, the directions of the contraction and extension are reversed from the above-mentioned directions.

The extending and contracting forces of mutually reversed directions of the first thin-film piezoelectric element 40*a* and the second thin-film piezoelectric element 40*b* are transmitted to the pair of piezoelectric member supporting portions 33*a*, 33*b* that are integrally joined in their lower sides. The piezoelectric member supporting portions 33*a*, 33*b* and the flexure top portion 33*f* are joined to each other through the elastic hinge portions 33*d*, 33*e*, each having a necked shape. The flexure top portion 33*f* fixedly secures the front end lower edge of the slider 50.

The contracting force along the arrow direction D is exerted on the piezoelectric member supporting portion 33*a* on the left side, while at the same time, the extending force along the arrow direction E is exerted on the piezoelectric member supporting portion 33*b* on the right side, so that the flexure top portion 33*f* makes a head-shaking movement in the arrow F direction together with the slider supporting member 32 that supports its lower side through the elastic hinge portions 33*d*, 33*e*. This movement takes place during period $T_1$. During period $T_2$, the head-shaking movements of the flexure top portion 33*f* and the slider supporting member 32 take place in the direction reversed to the arrow F direction.

The slider supporting member 32 and the flexure top portion 33*f* are integral members. The front end lower edge of the slider 50 is fixedly bonded to the flexure top portion 33*f* (see FIG. 5), its electrode terminals 52*a*, 52*b*, 52*c* and 52*d* are respectively connected to the lands 34*a*', 34*b*', 34*c*' and 34*d*' electrically in the flexure top portion 33*f*, the lower face of the slider 50 is secured to the step-shaped slider center-of-gravity holding portion 32*b* of the slider supporting portion 32 in its center of gravity (geometric center), and the lower face of the slider center-of-gravity holding portion 32*b* is supported by the protrusion 28 of the load beam 20 in a non-fixed state. Therefore, when the slider supporting member 32 and the flexure top portion 33*f* are allowed to make the head-shaking operations, the head-shaking operations take place at the portion of the step-shaped slider center-of-gravity holding portion 32*b*, with the protrusion 28 serving as the center of pivotal movements. Consequently, the slider 50 also carries out the head-shaking operation with the protrusion 28 serving as the center of pivotal movements so that the head 60, placed in the center of the front edge face of the slider 50, is allowed to pivot with the protrusion 28 serving as the center of pivotal movements. In other words, it is shifted in the arrow F direction or in the reversed direction thereof, and this direction is a transversing direction of the track in the magnetic disk 70. Here, in FIG. 12B, d represents the rotation radius of the head 60 with the protrusion 28 serving as the center O of pivotal movements.

In the load beam 20, the beam main section 24 to which the wiring substrate 33 that is the main section of the flexure 30 is attached is supported on the base portion 21 through a pair of plate spring sections 27*a*, 27*b* so that a pressing force in the normal direction is applied by the plate spring sections 27a, 27b to the beam face of the beam main section 24. The pressing force on the beam main section 24 is applied to the slider 50 from the protrusion 28 through the slider center-of-gravity holding portion 32b as a load. This load is set to, for example, 20 to 30 mN (milli-Newton). This load is exerted between the protrusion 28 and the slider center-of-gravity holding portion 32b so that a frictional force is exerted; therefore, although the slider supporting member 32 is allowed to pivot around the protrusion 28 serving as the center of pivotal movements, it is free from any other positional deviations. In other words, the protrusion 28 and the slider center-of-gravity holding portion 32b are only allowed to contact each other, and do not have any bearing structure; however, the above-mentioned frictional force achieves the pivotal movements of the slider supporting member 32 and the slider 50 around the protrusion 28 without causing any positional deviations. Moreover, in the case of the application of any bearing structure, there is any adverse effect in the pitching operation and the rolling operation in the slider 50; however, in the embodiment of the present invention, since there is no bearing structure, it is possible to smoothly carry out the pitching operation and the rolling operation of the slider 50. In addition, it is also possible to smoothly carry out the yawing operation in the slider 50 that is a pivotal movement centered on the protrusion 28.

A detailed explanation will be given of the operations in which the thin-film piezoelectric element 40a on the left side is allowed to contract while the thin-film piezoelectric element 40b on the right side is allowed to extend.

When the thin-film piezoelectric element 40a on the left side is allowed to contract, the contracting force is directly exerted on the elastic hinge portion 33d on the left. The elastic hinge portion 33d is drawn toward the base end side so that the slider supporting member 32 is displaced in the F direction around the protrusion 28. The transmission of this displacement is absorbed and alleviated by the portion of the elastic hinge portion 33e on the right side, which is located on the opposite side, with the result that it is not exerted on the thin-film piezoelectric element 40b on the right side that is allowed to extend. The reason for this is just because the elastic hinge portion 33e has a necked shape and constitutes the fulcrum C2 for rocking movements, as explained from the dynamical point of view by reference to FIG. 12B.

In contrast, when the thin-film piezoelectric element 40b on the right side is allowed to extend, the extending force is directly exerted on the elastic hinge portion 33e on the right side. The elastic hinge portion 33e is pushed toward the free end side so that the slider supporting member 32 is displaced in the F direction around the protrusion 28. The transmission of this displacement is absorbed and alleviated by the portion of the elastic hinge portion 33d on the left side, which is located on the opposite side, with the result that it is not exerted on the thin-film piezoelectric element 40a on the left side that is allowed to contract. The reason for this is just because the elastic hinge portion 33d has a necked shape and constitutes the fulcrum C1 for rocking movements, as explained from the dynamical point of view.

As a result, the pair of thin-film piezoelectric elements 40a, 40b allows the portion of the flexure top portion 33f that is located virtually closer to the free end side than to the pair of elastic hinge portions 33d, 33e to pivot around the protrusion 28, while virtually maintaining the symmetrical property with each other. In other words, the extending and contracting operations of the pair of thin-film piezoelectric elements 40a, 40b, that is, the extending operation of one element and the contracting operation of the other, are smoothly achieved without any interference with each other. Consequently, it is possible to allow the slider supporting member 32 and the slider 50 to smoothly pivot with less resistance by using a smaller driving force.

Figures 14A, 14B, 14C, 14D:
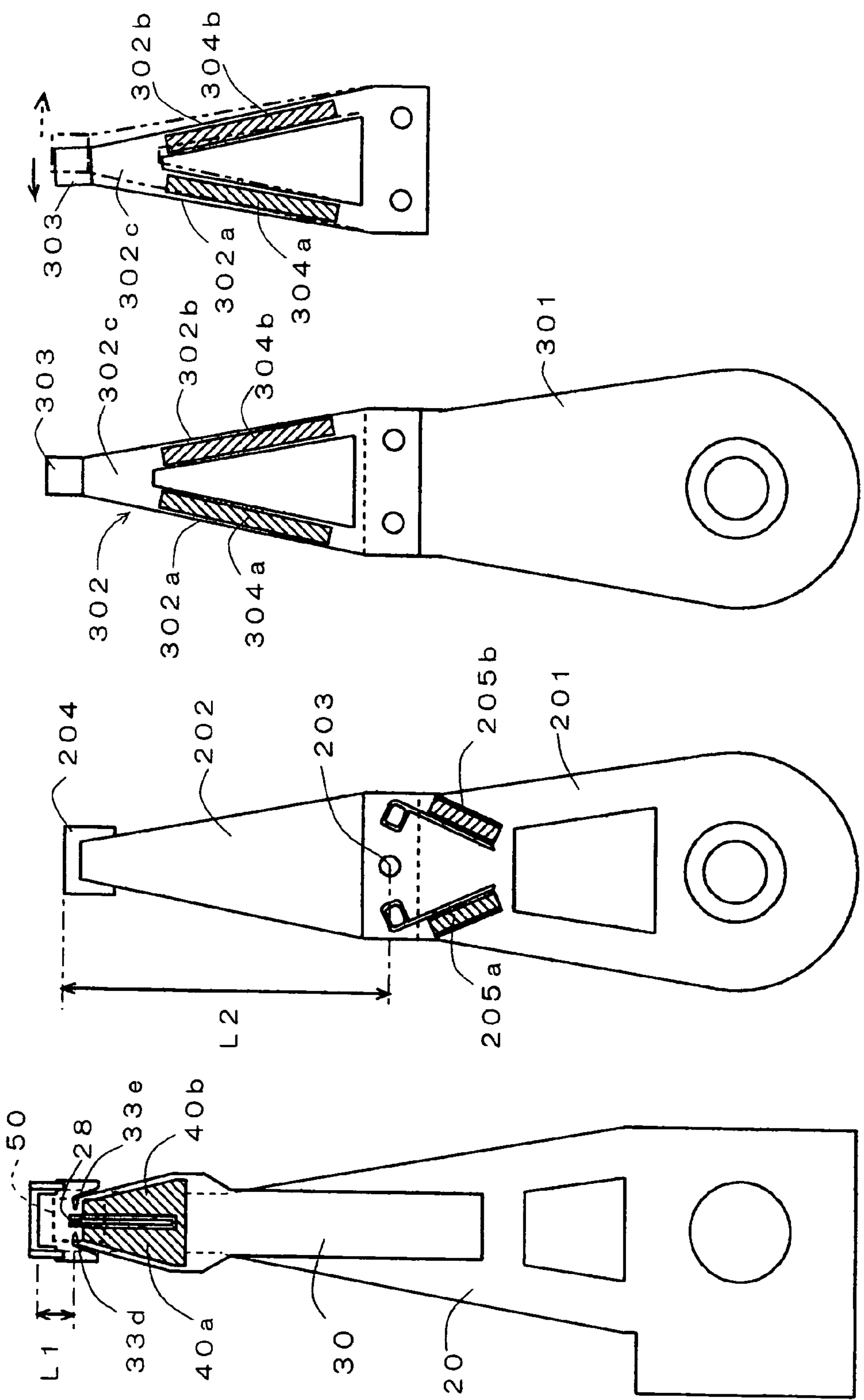
FIG. 14A is a plan view that explains the effective radius of the pivotal movement and the suppressed state of a reactive force against the pivotal movement and prevention of reactive force in pivotal movement of the slider in the head supporting mechanism in accordance with the embodiment of the present invention.
FIG. 14B is a plan view that shows a comparative example that has a greater effective radius.
FIG. 14C is a plan view that shows a comparative example in which a reactive force is generated in a pivotal movement.
FIG. 14D is an explanatory drawing that shows the operation of the comparative example.

Referring to FIG. 14A, an explanation will be given of the advantage of the fact that the slider supporting member 32 and the slider 50 are supported so as to freely pivot by the protrusion 28 placed on the free end side of the load beam 20. FIG. 14B and FIG. 14C show comparative examples.

As illustrated in FIG. 14B, a suspension arm 202 is attached to an actuator arm 201 through a supporting shaft 203 so as to freely pivot thereon, a slider 204 is attached to the free end of the suspension arm 202, and a pair of thin-film piezoelectric elements 205a, 205b are attached to the actuator arm 201; thus, the suspension arm 202 is allowed to rock around the supporting shaft 203 by the extending and contracting operations of the thin-film piezoelectric elements 205a, 205b.

The effective radius of the rocking movements of the head (not shown) installed on the slider 204 is set to L2 occupied by the suspension arm 202 located closer to the free end than to the supporting shaft 203 and the slider 204, which is considerably long.

In contrast, in the case of the embodiment of the present invention, as illustrated in FIG. 14A, the head 60 installed on the slider 50 has its center of pivotal movements on the protrusion 28 that is placed at a position sufficiently shifted toward the free end side in the length direction of the load beam 20. The effective radius of the pivotal movements of the head 60 is L1, which is sufficiently shorter in comparison with the case shown in FIG. 14B.

In the case of FIG. 14C, a load beam 302 is attached to an actuator arm 301. The load beam 302 is constituted by a pair of elastic beams 302a, 302b and a connecting portion 302c of these. A slider 303 is attached to the connecting portion 302c. Thin-film piezoelectric elements 304a, 304b are affixed to the surface of the beams 302a, 302b.

One of the paired thin-film piezoelectric elements 304a, 304b is allowed to extend, while the other is allowed to contract so that, as illustrated in FIG. 14D, one of the paired beams 302a, 302b is allowed to extend while the other is allowed to contract. Thus, the slider 303 is laterally displaced together with the connecting portion 302c of the pair of beams 302a, 302b.

However, in this case, the beam 302b on the extending side acts on the other beam 302a through the connecting portion 302c so as to prevent it from contracting; in contrast, the beam 302a on the contracting side acts on the other beam 302b through the connecting portion 302c so as to prevent it from extending. In other words, not by pivotal movements around the pivotal center, but by simultaneous actions between pushing and drawing, the slider 303 is displaced laterally. That is, this arrangement causes a state in which a comparatively large reactive force is generated. This arrangement requires a greater force, and fails to carry out a smooth displacement in the slider 303.

In contrast, in the case of the embodiment of the present invention, pivotal movements are carried out by a translational link mechanism around the protrusion 28 on the free end side of the load beam 20 serving as the center of pivotal movements, and the fulcrum for racking movements of the link mechanism is constituted by elastic hinge portions 33d, 33e so that it is possible to smoothly carry out the displacement of the slider 50 by using a smaller force.

In accordance with the embodiment of the present invention, by the above-mentioned interactive effects, it is possible to allow the head to make a fine displacement at high speeds with high precision without a delay in response, in the tracking compensating operation.

Next, an explanation will be given of the effects of the positional relationship between the protrusion 28 in the load beam 20 that forms the center of pivotal movements and the pair of elastic hinge portions 33*d*, 33*e*.

Here, referring to FIGS. 15A to FIG. 15E, the explanation will be given. Reference numeral 80*a* is a fulcrum corresponding to the protrusion 28 of the load beam, 81*a* and 81*b* are first and second displacement members corresponding to the pair of thin-film piezoelectric elements 40*a*, 40*b*, reference numerals 82*a* and 82*b* are first and second rocking fulcrums corresponding to the pair of elastic hinge portions 33*d* and 33*e*, and reference numeral 90 is a subject for pivotal movements corresponding to slider supporting member 32 and a slider 50.

Figure 15A:
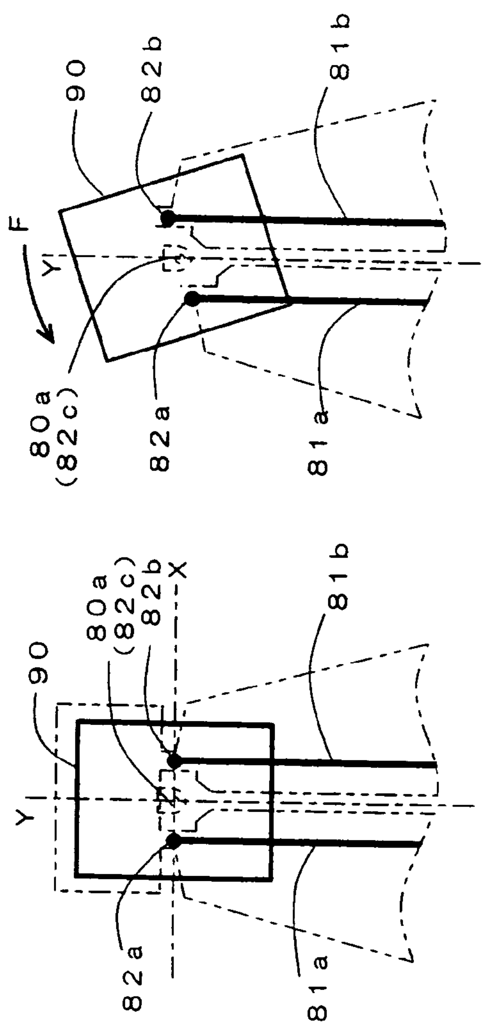
FIG. 15A is an explanatory drawing that shows a positional relationship between the center of pivotal movements of the slider supporting member of the head supporting mechanism and the pair of the elastic hinge portions in accordance with the embodiment of the present invention.

In the case of the embodiment of the present invention, as illustrated in FIG. 15A, when a straight line X is drawn in a right angle direction with respect to the center line Y of the load beam 80 passing through the center 80*a* of pivotal movements, the pair of rocking fulcrums 82*a*, 82*b* are located on the straight line X. In other words, the middle point 82*c* of the rocking fulcrums 82*a*, 82*b* is coincident with the fulcrum 80*a*.

Figure 15B:
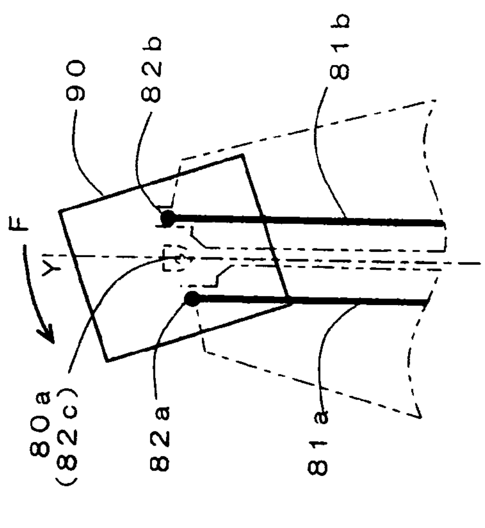
FIG. 15B is an explanatory drawing that shows the operation of the head supporting mechanism in accordance with the embodiment of the present invention.
Figure 15C:
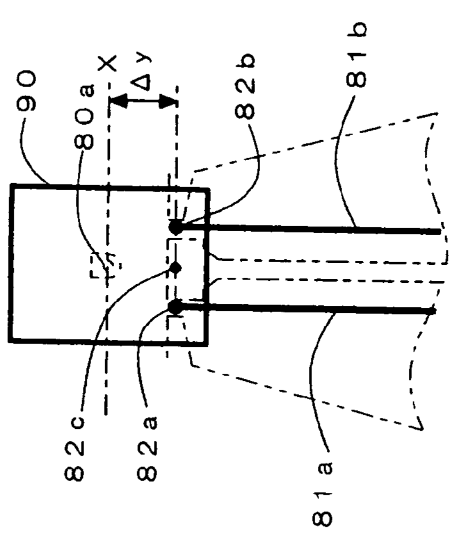
FIGS. 15C to 15E are explanatory drawings of a comparative example.

In the case of a comparative example shown in FIG. 15C, the pair of rocking fulcrums 82*a*, 82*b* are separated from the straight line X. There is an offset of Δy between the middle point 82*c* of the pair of rocking fulcrums 82*a*, 82*b* and the fulcrum 80*a*.

Figure 15D:
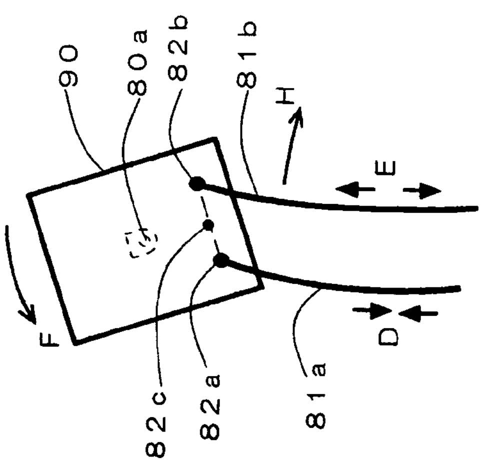
Figure 15E:
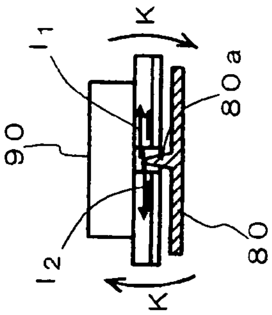

With respect to the comparative example, an explanation will be given of an operation in the case when, as illustrated in FIG. 15D, the subject 90 for pivotal movements is allowed to pivot in the direction of arrow F. Simultaneously as the first displacement member 81*a* is allowed to contract in the direction of arrow D, the second displacement member 81*b* is allowed to extend in the direction of arrow E. In direct operations, the subject 90 for pivotal movements tries to pivot centered on the middle point 82*c* of the pair of rocking fulcrums 82*a*, 82*b*. However, in fact, the actual center of pivotal movements is placed on the fulcrum 80*a* due to a frictional force at the contact point between the fulcrum 80*a* and the subject 90 for pivotal movements. Due to such a mismatching in the transmission of the action force, the pair of displacement members 81*a*, 81*b* are displaced in the direction of arrow H opposite to the direction of arrow F. Moreover, a frictional force is generated in the direction of arrow $I_1$ in the subject 90 for pivotal movements, while a reactive force is generated in the direction of arrow $I_2$ in the fulcrum 80*a*, at the contact point between the subject 90 for pivotal movements and the fulcrum 80*a*. These form a couple of forces, with the result that as illustrated in FIG. 15E, the load beam 80 is twisted in the direction of arrow K.

In contrast, in the case of the embodiment of the present invention, as illustrated in FIG. 15A, the middle point 82*c* of the pair of rocking fulcrums 82*a*, 82*b* is coincident with the supporting point 80*a*; therefore, as illustrated in FIG. 15B, when the subject 90 for pivotal movements is allowed to pivot in the arrow F direction, action forces react symmetrically with respect to the center line Y, resulting in no twisting movement in the load beam 80. In other words, it is possible to effectively carry out the transmission of the reaction force and consequently to improve the responding property.

Next, an explanation will be given of an advantage obtained by the fact that the center of gravity of the subject for pivotal movements and the center of pivotal movements are coincident with each other.

Figure 16A:
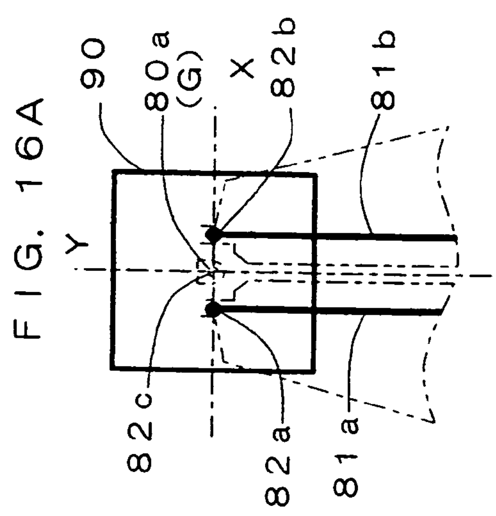
FIG. 16A is an explanatory drawing that shows a positional relationship between the center of gravity of a subject of the pivotal movements consisting of the slider supporting member and the slider and the center of pivotal movements in the head supporting mechanism in accordance with the embodiment of the present invention.

As illustrated in FIG. 16A, in the case of the embodiment of the present invention, the center of gravity G of the subject 90 for pivotal movements and the center 80*a* of pivotal movements of the subject 90 for pivotal movements are coincident with each other.

Figure 16B:
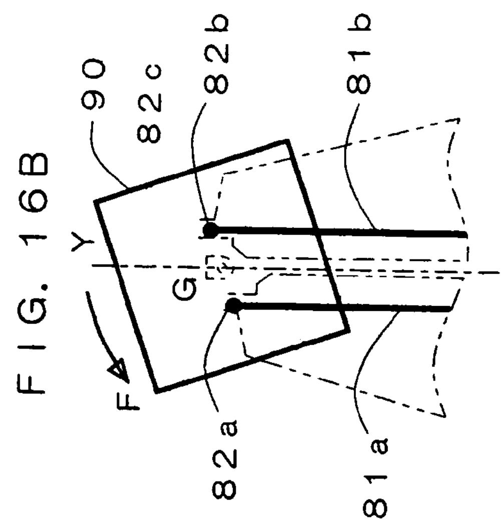
FIG. 16B is an explanatory drawing that shows the operation of the head supporting mechanism in accordance with the embodiment of the present invention.
Figure 16C:
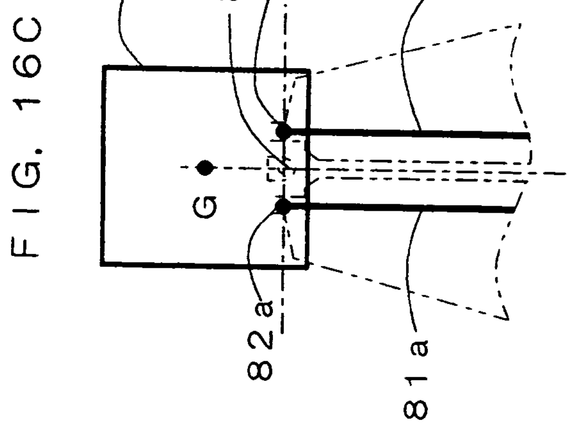
FIGS. 16C to 16E are explanatory drawings of a comparative example.

In the case of a comparative example shown in FIG. 16C, the center 80*a* of pivotal movements of the subject 90 for pivotal movements has an offset from the center of gravity G of the subject 90 for pivotal movements.

Figure 16D:
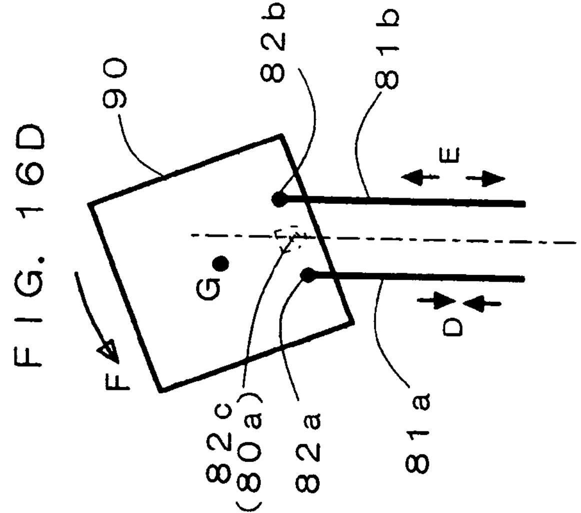
Figure 16E:
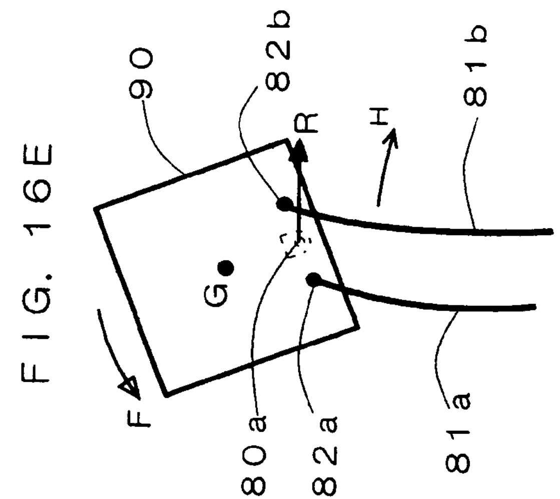

In the case of the comparative example, an explanation will be given of an operation in which the subject 90 of pivotal movements is allowed to pivot in the direction of arrow F. As illustrated in FIG. 16D, simultaneously as the first displacement member 81*a* is allowed to contract in the direction of arrow D, the second displacement member 81*b* is allowed to extend in the direction of arrow E. The subject 90 for pivotal movements is allowed to rotate centered on the fulcrum 80*a* that is coincident with the middle point 82*c* of the pair of rocking fulcrums 82*a* and 82*b*. The pivotal movement of this subject 90 for pivotal movements is exerted as a moment in the center of gravity G centered on the fulcrum 80*a*. However, in the case when the center of gravity and the center of pivotal movements are not coincident with each other, a reactive force R is generated in the fulcrum 80*a* that is the center of pivotal movements, as illustrated in FIG. 16E. This reactive force R is exerted on the pair of displacement members 81*a*, 81*b* so that the displacement members 81*a*, 81*b* are displaced in the direction of arrow H that is opposite to the direction of arrow F. This serves as an action for returning the subject 90 for pivotal movements in the reversed direction, causing a delay in response in the tracking compensation.

In contrast, in the case of the embodiment of the present invention, as illustrated in FIG. 16A, the fulcrum 80*a* that is coincident with the middle point of the pair of rocking fulcrums 82*a*, 82*b* is also coincident with the center of gravity G of the subject 90 for pivotal movements; therefore, as illustrated in FIG. 16B, when the subject 90 for pivotal movements is allowed to pivot in the direction of arrow F, the active forces are exerted symmetrically with respect to the center line Y so that no returning active force is generated in the displacement members 81*a*, 81*b*. In other words, the transmission of the active force is effectively carried out, and it becomes possible to improve the responding property.

As illustrated in FIG. 17A, in the embodiment of the present invention, the thin-film piezoelectric elements 40*a*, 40*b* are affixed on the piezoelectric member supporting portions 33*a*, 33*b* of the flexure 30, and in the same manner, the head-use wire 34 is formed on the piezoelectric member supporting portions 33*a*, 33*b*. With respect to the thin-film piezoelectric element 40*a* on the left side, the head-use wire 34 is placed as a combination of the first head wire 34*a*, the second head wire 34*b* and the ground wire 35*d*, and with respect to the thin-film piezoelectric element 40*b* on the right side, it is placed as a combination of the third head wire 34*c*, the fourth head wire 34*d* and the ground wire 35*d*. The thickness of these wires is made sufficiently large so as to have a height equal to the height of the thin-film piezoelectric elements 40*a*, 40*b*. These wires are constituent elements of the flexure 30. In other words, a neutral axis 30_n_ in the center in the thickness direction of the flexure 30 is made coincident with a neutral axis 40_n_ of the thin-film piezoelectric elements 40_a_, 40_b_.

The following description will discuss an advantage of this arrangement in which the neutral axis 30_n_ and the neutral axis 40_n_ are coincident with each other.

FIG. 17B and FIG. 17C are comparative examples each of which is provided with piezoelectric supporting portions 33_a_, 33_b_ in which wires 34_e_ and 34_f_ are embedded, and on these are affixed thin-film piezoelectric elements 40_a_, 40_b_. Since the wires 34_e_, 34_f_ are embedded inside the piezoelectric supporting portions 33_a_, 33_b_, the neutral axis 30_n_ of the flexure (elastic hinge) and the neutral axis 40_n_ of the thin-film piezoelectric elements 40_a_, 40_b_ has a step difference of Δt.

FIG. 17D shows a state in which after voltages having reversed polarities have been alternately applied to the thin-film piezoelectric elements 40_a_, 40_b_, a mechanical resonance is generated. This resonance generates vibration 88 in the normal direction at the flexure. In the case of the comparative example, since the neutral axis 30_n_ of the flexure and the neutral axis 40_n_ of the thin-film piezoelectric elements has the step difference of Δt, the step difference comes to form an arm 45 of moment in the vibration. Then, the vibration of the flexure is amplified through the arm 45 so that a phenomenon is induced with the result that the elastic hinge portions 33_d_, 33_e_ are vibrated in the direction of arrow M. This causes unnecessary movements in the pitching direction in the slider.

In contrast, in the embodiment of the present invention, as illustrated in FIG. 9A and FIG. 17A, the neutral axis 30_n_ of the flexure and the neutral axis 40_n_ of the thin-film piezoelectric elements are coincident with each other so that no arm of moment is given; therefore, even if the flexure 30 is vibrated by the mechanical resonance, it is possible to regulate its amplitude. As a result, the tracking compensation control is carried out at high speeds with high precision.

Here, in the explanation of the above-mentioned embodiment, in the flexure 30, the left side piezoelectric supporting portion 33_a_ and the right side piezoelectric supporting portion 33_b_ are separated from each other by the slit 33_c_; however, with respect to another arrangement beside this, these two piezoelectric supporting sections 33_a_, 33_b_ may be integrally connected to each other on a flat face. In this case, it is possible to provide a function for regulating unwanted vibrations in the normal direction in the thin-film piezoelectric unit 40.

Figure 18:
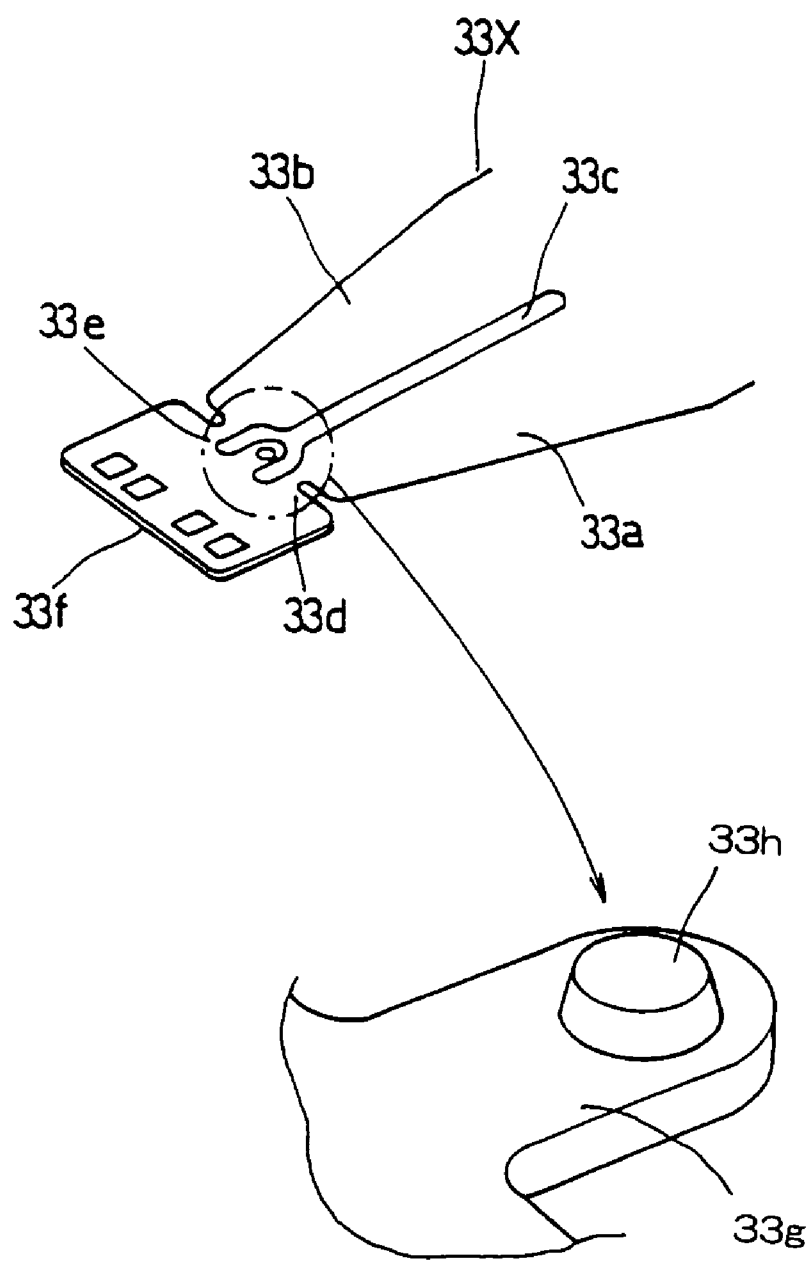
FIG. 18 is a perspective drawing that shows a structure of another embodiment (modified slider center-of-gravity supporting section) of the present invention.

With respect to the step-shaped slider center-of-gravity holding portion 32_b_ of the flexure 30, instead of the bending process of the slider supporting member 32 into a stepped shape, as illustrated in FIG. 18, simultaneously as the patterning of the wiring is carried out on the wiring substrate 33, protrusions may be formed. In this arrangement, in the flexure top portion 33_f_, a portion facing the slit 33_c_ is expanded toward the slit 33_c_ side, and on its expanded portion 33_g_, a protrusion 33_h_ which supports the slider 50 so as to freely pivot on its center of gravity or in the vicinity thereof is formed. Although this arrangement is inferior in its applicability to a plurality of specifications, it is possible to eliminate the bending process for the stepped shapes While there has been described what is at present considered to be preferred embodiments of the invention, it will be understood that various modifications may be made therein, and it is intended to cover in the appended claims all such modifications as fall within the true spirit and scope of this invention.

What is claimed is:

1. A head supporting mechanism comprising:

a slider on which a head for recording and/or reproducing data on and from a recording medium is installed;

a slider supporting member for supporting the slider;

a loan beam having a dimple placed on a free end thereof;

a flexure disposed on the load beam; and a pair of displacement members disposed between the flexure and the slider supporting member, wherein:

the slider supporting member and the pair of displacement members are connected by a pair of elastic hinge portions provided at an end portion of the slider supporting member, and a translational link mechanism is constituted by a first link which is connected with a pair of elastic hinge portions and holds the slider, a second link consisting of one of displacement members which is connecting with one of the elastic hinge portions and the flexure and a third link consisting of another displacement member which is connecting with another elastic hinge portion and the flexure, and the first link is disposed on the dimple and is rotatable around the dimple.

2. The head supporting mechanism according to claim 1, wherein the pair of elastic hinge portions are placed within a slider area range of the slider, in a stacking direction of the slider and the slider supporting member.

3. The head supporting mechanism according to claim 1, wherein a wire is allowed to pass through the pair of elastic hinge portions.

4. The head supporting mechanism according to claim 1, wherein the pair of displacement members are constituted by a pair of thin-film piezoelectric members.

5. The head supporting mechanism according to claim 1, wherein the flexure, at two portions that are symmetrical with respect to the center line of the load beam which is parallel to the length direction of the load beam and passes through the dimple, the pair of elastic hinge portions, each having a necked shape, are formed.

6. The head supporting mechanism according to claim 1, wherein the pair of elastic hinge portions are placed on a straight line in a right angle direction with respect to the length direction of the load beam, which passes through the dimple.

7. The head supporting mechanism according to claim 1, wherein the slider supporting member is supported by the dimple so as to freely pivot on a position of the center of gravity of an entire subject of pivotal movements comprising the slider and the slider supporting member.

8. The head supporting mechanism according to claim 1, wherein each of the pair of displacement members is placed in a symmetrical manner with respect to the center line which is parallel to the length direction of the load beam and passes through the center of rotation of the slider supporting member.

9. The head supporting mechanism according to claim 1, wherein a part of said flexure is constituted by a flexible wiring substrate made of a resin, and the pair of displacement members are placed on said wiring substrate.

10. The head supporting mechanism according to claim 1, wherein center of a line connected to a pair of elastic hinge portions is coincident with the dimple.

11. The head supporting mechanism according to claim 1, wherein the second and third links are configured to expand, and contact the first link, independently of each other.

* * * * *